United States Patent
Goto et al.

(10) Patent No.: US 11,115,960 B2
(45) Date of Patent: Sep. 7, 2021

(54) TERMINAL APPARATUS AND COMMUNICATION METHOD

(71) Applicants: SHARP KABUSHIKI KAISHA, Sakai (JP); FG INNOVATION COMPANY LIMITED, Tuen Mun (HK)

(72) Inventors: Jungo Goto, Sakai (JP); Osamu Nakamura, Sakai (JP); Seiji Sato, Sakai (JP); Yasuhiro Hamaguchi, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/636,621

(22) PCT Filed: Aug. 10, 2018

(86) PCT No.: PCT/JP2018/030074
§ 371 (c)(1),
(2) Date: Feb. 4, 2020

(87) PCT Pub. No.: WO2019/031603
PCT Pub. Date: Feb. 14, 2019

(65) Prior Publication Data
US 2020/0383089 A1 Dec. 3, 2020

(30) Foreign Application Priority Data
Aug. 10, 2017 (JP) .............................. JP2017-155578

(51) Int. Cl.
*H04W 72/04* (2009.01)
*H04L 1/18* (2006.01)
(52) U.S. Cl.
CPC ........... *H04W 72/04* (2013.01); *H04L 1/1812* (2013.01)

(58) Field of Classification Search
CPC .... H04L 1/1812; H04W 28/04; H04W 72/04; H04W 72/01
See application file for complete search history.

(56) References Cited

U.S. PATENT DOCUMENTS

| | | | |
|---|---|---|---|
| 2014/0146697 A1* | 5/2014 | Kim ..................... | H04B 7/0417 370/252 |
| 2017/0311201 A1* | 10/2017 | Uchino ................. | H04W 28/04 |

(Continued)

OTHER PUBLICATIONS

3rd Generation Partnership Project; Technical Specification Group Radio Access Network; "Study on provision of low-cost Machine-Type Communications (MTC) User Equipments (UEs) based on LTE" (Release 12), 3GPP TR 36.888 V12.0.0 (Jun. 2013).

(Continued)

*Primary Examiner* — Gregory B Sefcheck
*Assistant Examiner* — Debebe A Asefa
(74) *Attorney, Agent, or Firm* — ScienBiziP, P.C.

(57) ABSTRACT

A terminal apparatus includes a transmitter configured to transmit PUSCH data and a receiver configured to receive RRC information. The transmitter transmits the PUSCH data by using a resource associated with an HARQ process ID determined by symbol information for transmission of the PUSCH data, a period, and the number of HARQ processes. In a case that the receiver receives no response to the transmission of the PUSCH data with the HARQ process ID after the transmission of the PUSCH data is performed and before a timer included in the RRC information expires, the transmitter transmits new PUSCH data by using the resource associated with the HARQ process ID determined by the symbol information for the transmission of the PUSCH data, the period, and the number of HARQ processes.

3 Claims, 17 Drawing Sheets

(56) References Cited

U.S. PATENT DOCUMENTS

2018/0124749 A1* 5/2018 Park .................. H04W 74/08
2018/0124827 A1* 5/2018 Lee .................... H04L 1/1822

OTHER PUBLICATIONS

3rd Generation Partnership Project; Technical Specification Group GSM/EDGE Radio Access Network; "Cellular system support for ultra-low complexity and low throughput Internet of Things (CIoT)" (Release 13), 3GPP TR 45.820 V13.0.0 (Aug. 2015).

ZTE et al.: "WF on Scenarios for Multiple Access", R1-165595, 3GPP TSG RAN WG1 #85 meeting, Nanjing, China, May 23-27, 2016.

Huawei, Hisilicon: "UL Grant-free transmission", R1-1701665, 3GPP TSG RAN WG1 Meeting #88, Athens, Greece, Feb. 13-17, 2017.

* cited by examiner

TERMINAL APPARATUS AND COMMUNICATION METHOD

TECHNICAL FIELD

The present invention relates to a terminal apparatus and a communication method for the terminal apparatus.

This application claims priority to JP 2017-155578 A filed on Aug. 10, 2017, the contents of which are incorporated herein by reference.

BACKGROUND ART

In recent years, 5th Generation (5G) mobile telecommunication systems have been focused on, and a communication technology is expected to be specified, the technology establishing MTC mainly based on a large number of terminal apparatuses (Massive Machine Type Communications; mMTC), Ultra-reliable and low latency communications (URLLC), and enhanced Mobile BroadBand (eMBB). The 3rd Generation Partnership Project (3GPP) has been studying New Radio (NR) as a 5G communication technique and discussing NR Multiple Access (MA).

In 5G, Internet of Things (IoT) is expected to be established that allows connection of various types of equipment not previously connected to a network, and establishment of mMTC is an important issue. In 3GPP, a Machine-to-Machine (M2M) communication technology has already been standardized as Machine Type Communication (MTC) that accommodates terminal apparatuses transmitting and/or receiving small size data (NPL 1). Furthermore, in order to support data transmission at a low rate in a narrow band, effort has been made to specify Narrow Band-IoT (NB-IoT) (NPL 2). 5G is expected to accommodate more terminals than the above-described standards and to accommodate IoT equipment requiring ultra-reliable and low-latency communications.

On the other hand, in communication systems such as Long Term Evolution (LTE) and LTE-Advanced (LTE-A) which are specified by the 3GPP, terminal apparatuses (User Equipment (UE)) use a Random Access Procedure, a Scheduling Request (SR), and the like, to request a radio resource for transmitting uplink data to a base station apparatus (also referred to as a Base Station (BS) or an evolved Node B (eNB)). The base station apparatus provides uplink grant (UL Grant) to each terminal apparatus based on an SR. In a case that the terminal apparatus receives UL Grant for control information from the base station apparatus, the terminal apparatus transmits uplink data using a given radio resource (referred to as Scheduled access or grant-based access and hereinafter referred to as scheduled access), based on an uplink transmission parameter included in the UL Grant. In this manner, the base station apparatus controls all uplink data transmissions (the base station apparatus knows radio resources for uplink data transmitted by each terminal apparatus). In the scheduled access, the base station apparatus can establish Orthogonal Multiple Access (OMA) by controlling uplink radio resources.

5G mMTC includes a problem in that the use of the scheduled access increases the amount of control information. URLLC includes a problem in that the use of the scheduled access increases delay. Thus, grant free access (also referred to as grant less access, Contention-based access, Autonomous access, or the like; hereinafter referred to as grant free access) has been studied in which the terminal apparatus transmits data without performing any random access procedure, SR transmission, UL Grant reception, or the like (NPL 3). In the grant free access, increased overhead associated with control information can be suppressed even in a case that a large number of devices transmit small size data. Furthermore, in the grant free access, no UL Grant reception or the like is performed, and thus the time from generation until transmission of transmission data can be shortened.

For the grant free access, switching to scheduled access by using a grant at the time of retransmission has been studied. Introduction of process identifiers (process ID or PID) has been studied to allow multiple processes of grant free access and scheduled access for retransmission. For grant free access data transmission, association of the PIDs with time or frequency radio resource used for the grant free access has been studied.

CITATION LIST

Non Patent Literature

NPL 1: 3GPP, TR36.888, V12.0.0, "Study on provision of low-cost Machine-Type Communications (MTC) User Equipments (UEs) based on LTE. June 2013

NPL 2: 3GPP, TR45.820 V13.0.0, "Cellular system support for ultra-low complexity and low throughput Internet of Things (CIoT)," August 2015

NPL 3: R1-165595, 3GPP TSG RAN WG1 #85 Meeting, Nanjing, China, May 23-27, 2016

SUMMARY OF INVENTION

Technical Problem

In a case of switching retransmission for data transmission through grant free access to schedule-based access, a terminal apparatus performing data transmission corresponding to mMTC or URLLC disadvantageously fails to achieve process management unless the terminal apparatus properly indicates, in a grant for the retransmission, which PID corresponds to the retransmission.

In view of such circumstances, an object of an aspect of the present invention is to provide a terminal apparatus and a communication method that can efficiently accommodate a terminal apparatus transmitting data for grant free access in URLLC.

Solution to Problem

To address the above-mentioned drawbacks, a base station apparatus, a terminal apparatus, and a communication method according to an aspect of the present invention are configured as follows.

(1) One aspect of the present invention is a terminal apparatus for communicating with a base station apparatus, the terminal apparatus including: a transmitter configured to transmit PUSCH data; and a receiver configured to receive RRC information, wherein the RRC information includes resource information for transmission of the PUSCH data, the number of HARQ processes, a period, and an expiration time for a timer for the transmission of the PUSCH data, the resource information for the transmission of the PUSCH data includes symbol information for the transmission of the PUSCH data, an HARQ process ID is determined by the symbol information for the transmission of the PUSCH data, the period, and the number of HARQ processes, the transmitter transmits the PUSCH data by using a resource associated with the HARQ process ID determined by the symbol information for the transmission of the PUSCH data, the period, and the number of HARQ processes, and in a case that the receiver receives no response to the transmission of the PUSCH data with the HARQ process ID after the transmission of the PUSCH data is performed and before the timer included in the RRC information expires, the transmitter transmits new PUSCH data by using the resource associated with the HARQ process ID determined by the symbol information for the transmission of the PUSCH data, the period, and the number of HARQ processes.

(2) One aspect of the present invention is a terminal apparatus for communicating with a base station apparatus, the terminal apparatus including a transmitter configured to transmit data, and a receiver configured to receive control information through an RRC and a physical downlink control channel, wherein transmission parameters notified through the RRC include at least subcarrier and slot information indicating multiple radio resources that can be used in data transmission, the control information includes information for allowing data transmission using at least one of the radio resources, the transmitter is configured to perform data transmission of a first process ID and at least one second process ID that are calculated from slot index, and in a case that the control information indicating retransmission for data transmission using the first process ID is received, the transmitter halts at least the data transmission in a radio resource of the multiple radio resources associated with the first process ID until the transmitter receives an ACK for the retransmission of the first process ID.

(3) In one aspect of the present invention, in a case that the control information indicating the retransmission for the data transmission with the first process ID is received, data transmission is performed in a radio resource of the multiple radio resources associated with the second process ID.

(4) In one aspect of the present invention, in a case that the control information indicating the retransmission for the data transmission with the first process ID is received, and in a case that an ACK for the retransmission with the first process ID fails to be received before a prescribed number of slots is reached, the data transmission in the radio resource associated with the first process ID is resumed.

(5) In one aspect of the present invention, in a case that the control information indicating the retransmission for the data transmission with the first process ID is received, and in a case that a NACK for the retransmission with the first process ID is received a prescribed number of times, the data transmission in the radio resource associated with the first process ID is resumed.

(6) In one aspect of the present invention, multiple RNTIs used to detect the control information are present, and a process for the data transmission is identified based on an RNTI of the multiple RNTIs used during detection and the process ID included in the control information.

(7) In one aspect of the present invention, in a case that the data transmission with the first process ID has not been performed and the control information indicating the retransmission of the data transmission with the first process ID is received, a bit sequence is transmitted in a specified resource block, the bit sequence including 0s the number of which corresponds to the number of bits of a transport block size specified in the control information.

(8) In one aspect of the present invention, in a case that the data transmission with the first process ID has not been performed and the control information indicating the retransmission of the data transmission with the first process ID is received, at least one of a buffer status report, a Power Headroom, or CSI is transmitted in a resource block specified in the control information.

(9) One aspect of the present invention is a communication method for a terminal apparatus for communicating with a base station apparatus, the communication method including: receiving RRC information, wherein the RRC information includes resource information for transmission of PUSCH data, the number of HARQ processes, a period, and an expiration time for a timer for the transmission of the PUSCH data, the resource information for the transmission of the PUSCH data includes symbol information for the transmission of the PUSCH data, an HARQ process ID is determined by the symbol information for the transmission of the PUSCH data, the period, and the number of HARQ processes, the PUSCH data is transmitted by using a resource associated with the HARQ process ID determined by the symbol information for the transmission of the PUSCH data, the period, and the number of HARQ processes, and in a case that no response to the transmission of the PUSCH data with the HARQ process ID is received after the transmission of the PUSCH data is performed and before the timer included in the RRC information expires, new PUSCH data is transmitted by using the resource associated with the HARQ process ID determined by the symbol information for the transmission of the PUSCH data, the period, and the number of HARQ processes.

Advantageous Effects of Invention

According to one or more aspects of the present invention, the terminal apparatus can be efficiently accommodated that performs data transmission for URLLC through grant free access.

DESCRIPTION OF EMBODIMENTS

Figure 1:
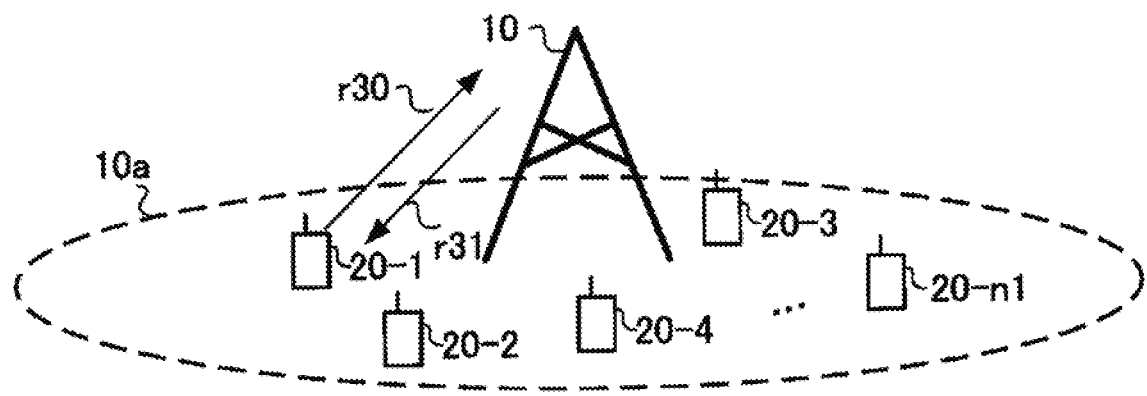
FIG. 1 is a diagram illustrating an example of a communication system according to a first embodiment.

A communication system according to the present embodiments includes a base station apparatus (also referred to as a cell, a small cell, a pico cell, a serving cell, a component carrier, an eNodeB (eNB), a Home eNodeB, a Low Power Node; a Remote Radio Head, a gNodeB (gNB), or a control station), and a terminal apparatus (also referred to as a terminal, a mobile terminal, a mobile station, or User Equipment (UE)). In the communication system, in case of a downlink, the base station apparatus serves as a transmitting apparatus (a transmission point, a transmit antenna group, or a transmit antenna port group), and the terminal apparatus serves as a receiving apparatus (a reception point, a reception terminal, a receive antenna group, or a receive antenna port group). In a case of an uplink, the base station apparatus serves as a receiving apparatus, and the terminal apparatus serves as a transmitting apparatus. The communication system is also applicable to Device-to-Device (D2D) communication. In this case, the terminal apparatus serves both as a transmitting apparatus and as a receiving apparatus.

The communication system is not limited to data communication between the terminal apparatus and the base station apparatus, the communication involving human beings, but is also applicable to a form of data communication requiring no human intervention, such as Machine Type Communication (MTC), Machine-to-Machine (M2M) Communication, communication for Internet of Things (IoT), or Narrow Band-IoT (NB-IoT) (hereinafter referred to as MTC). In this case, the terminal apparatus serves as an MTC terminal. The communication system can use, in the uplink and the downlink, a multicarrier transmission scheme such as Discrete Fourier Transform Spread-Orthogonal Frequency Division Multiplexing (DFTS-OFDM; also referred to as Single Carrier-Frequency Division Multiple Access (SC-FDMA)), or Cyclic Prefix-Orthogonal Frequency Division Multiplexing (CP-OFDM). The communication system can also use Filter Bank Multi Carrier (FBMC), Filtered-OFDM (f-OFDM) to which a filter is applied, Universal Filtered-OFDM (UF-OFDM), or Windowing-OFDM (W-OFDM), a transmission scheme using a sparse code (Sparse Code Multiple Access (SCMA)), or the like. Furthermore, the communication system may apply DFT precoding and use a signal waveform for which the filter described above is used. Furthermore, the communication system may apply code spreading, interleaving, the sparse code, and the like in the above-described transmission scheme. Note that, in the description below, at least one of the DFTS-OFDM transmission and the CP-OFDM transmission is used in the uplink, whereas the CP-OFDM transmission is used in the downlink but that the present embodiments are not limited to this configuration and any other transmission scheme is applicable.

The base station apparatus and the terminal apparatus according to the present embodiments can communicate in a frequency band for which a permission has been obtained from the government of a country or region where a radio operator provides service, i.e., a so-called licensed band, and/or in a frequency bands that requires no permission from the government of the country or region, i.e., a so-called unlicensed band. In the unlicensed band, communication may be based on carrier sense (e.g., a listen before talk scheme).

According to the present embodiments, "X/Y" includes the meaning of "X or Y".

According to the present embodiments, "X/Y" includes the meaning of "X and Y".

According to the present embodiments, "X/Y" includes the meaning of "X and/or Y".

First Embodiment

FIG. 1 is a diagram illustrating an example of a configuration of a communication system according to the present embodiment. The communication system according to the present embodiment includes a base station apparatus 10 and terminal apparatuses 20-1 to 20-$n1$ ($n1$ is a number of terminal apparatuses connected to the base station apparatus 10). The terminal apparatuses 20-1 and 20-$n1$ are also collectively referred to as terminal apparatuses 20. Coverage 10$a$ is a range (a communication area) in which the base station apparatus 10 can connect to the terminal apparatuses 20 (coverage 10$a$ is also referred to as a cell).

In FIG. 1, radio communication in an uplink r30 includes at least the following uplink physical channels. The uplink physical channels are used for transmitting information output from a higher layer.

Physical uplink control channel (PUCCH)
Physical uplink shared channel (PUSCH)
Physical random access channel (PRACH)

The PUCCH is a physical channel that is used to transmit Uplink Control Information (UCI). The uplink control information includes a positive acknowledgement (ACK)/negative acknowledgement (NACK) for downlink data (Downlink transport block, Medium Access Control Protocol Data Unit (MAC PDU), Downlink-Shared Channel (DL-SCH), Physical Downlink Shared Channel (PDSCH)). An ACK/NACK is also referred to as a Hybrid Automatic Repeat request ACKnowledgement (HARQ-ACK), HARQ feedback, an HARQ response, or HARQ control information, a signal indicating delivery confirmation.

The uplink control information includes a Scheduling Request (SR) used to request a PUSCH (Uplink-Shared Channel (UL-SCH)) resource for initial transmission. The scheduling request includes a positive scheduling request or a negative scheduling request. The positive scheduling request indicates that a UL-SCH resource for initial transmission is requested. The negative scheduling request indicates that the UL-SCH resource for the initial transmission is not requested.

The uplink control information includes Channel State Information (CSI) for the downlink. The channel state information for the downlink includes a Rank Indicator (RI) indicating a preferable spatial multiplexing number, a Precoding Matrix Indicator (PMI) indicating a preferable precoder, a Channel Quality Indicator (CQI) specifying a preferable transmission rate, and the like. The PMI indicates a codebook determined by a terminal apparatus. The codebook is associated with precoding of the physical downlink shared channel. The CQI can use a preferable modulation scheme (e.g., QPSK, 16QAM, 64QAM, 256QAMAM, or the like), a coding rate, and an index (CQI index) indicating a frequency efficiency. The terminal apparatus selects, from a CQI table, a CQI index at which a PDSCH transport block can be received without exceeding a prescribed block error probability (e.g., error rate 0.1).

The PUSCH is a physical channel that is used to transmit uplink data (Uplink Transport Block, Uplink-Shared Channel (UL-SCH)). The PUSCH may be used to transmit an HARQ-ACK and/or channel state information for the downlink data, together with the uplink data. The PUSCH may also be used to transmit only the channel state information. The PUSCH may also be used to transmit only the HARQ-ACK and the channel state information.

The PUSCH is used to transmit Radio Resource Control (RRC) signaling. The RRC signaling is also referred to as RRC message/RRC layer information/RRC layer signal/RRC layer parameter/RRC information element. The RRC signaling is information/signal that is processed in a radio resource control layer. The RRC signaling transmitted from the base station apparatus may be signaling common to multiple terminal apparatuses in a cell. The RRC signaling transmitted from the base station apparatus may be signaling dedicated to a certain terminal apparatus (also referred to as dedicated signaling). In other words, user equipment-specific (UE-specific) information is transmitted through signaling dedicated to the certain terminal apparatus. The RRC message can include a UE Capability of the terminal apparatus. The UE Capability is information indicating a function supported by the terminal apparatus.

The PUSCH is used to transmit a Medium Access Control Element (MAC CE). The MAC CE is information/signal that is processed (transmitted) in a Medium Access Control (MAC) layer. For example, a Power Headroom (PH) may be included in the MAC CE and may be reported via the physical uplink shared channel. In other words, a MAC CE field is used to indicate a level of the power headroom. The uplink data can include the RRC message and the MAC CE. The RRC signaling and/or the MAC CE is also referred to as higher layer signaling. The RRC signaling and/or the MAC CE is included in a transport block.

The PRACH is used to transmit a preamble used for random access. The PRACH is used for indicating the initial connection establishment procedure, the handover procedure, the connection re-establishment procedure, synchronization (timing adjustment) for uplink transmission, and the request for the PUSCH (UL-SCH) resource.

In the uplink radio communication, an Uplink Reference Signal (UL RS) is used as an uplink physical signal. The uplink reference signal includes a Demodulation Reference Signal (DMRS) and a Sounding Reference Signal (SRS). The DMRS is associated with transmission of the physical uplink shared channel/the physical uplink control channel. For example, the base station apparatus 10 uses the demodulation reference signal to perform channel estimation/channel compensation in a case of demodulating the physical uplink shared channel/physical uplink control channel.

The Sounding Reference Signal (SRS) is not associated with the transmission of the physical uplink shared channel/physical uplink control channel. In other words, regardless of presence or absence of uplink data transmission, the terminal apparatus transmits the SRS periodically or non-periodically. In the periodic SRS, the terminal apparatus transmits the SRS, based on parameters notified in a higher layer signal (e.g., RRC) by the base station apparatus. On the other hand, in the aperiodic SRS, the terminal apparatus transmits the SRS, based on a physical downlink control channel (for example, DCI) indicating the parameters and an SRS transmission timing notified in the higher layer signal (for example, RRC) by the base station apparatus. The base station apparatus 10 uses the SRS to measure an uplink channel state (CSI Measurement). The base station apparatus 10 may perform timing alignment and closed-loop transmission power control, based on measurement results obtained by the reception of the SRS.

In FIG. 1, in radio communication of a downlink r31, at least the following downlink physical channels are used. The downlink physical channels are used for transmitting information output from the higher layer.

Physical broadcast channel (PBCH)
Physical downlink control channel (PDCCH)
Physical downlink shared channel (PDSCH)

The PBCH is used for broadcasting a Master Information Block (MIB, a Broadcast Channel (BCH)) that is shared by the terminal apparatuses. The MIB is one of the system information. For example, the MIB includes a downlink transmission bandwidth configuration and a System Frame number (SFN). The MIB may include information for indicating at least a part of: the number of the slot in which PBCH is transmitted, the number of the subframe in which PBCH is transmitted, and the number of the radio frame in which PBCH is transmitted.

The PDCCH is used to transmit Downlink Control Information (DCI). For the downlink control information, multiple formats based on applications (also referred to as DCI formats) are defined. The DCI format may be defined, based on the type or the number of bits of the DCI constituting a single DCI format. The downlink control information includes control information for downlink data transmission and control information for uplink data transmission. The DCI format for downlink data transmission is also referred to as a downlink assignment (or downlink grant). The DCI format for uplink data transmission is also referred to as an uplink grant (or uplink assignment).

One downlink assignment is used for scheduling of one PDSCH within one serving cell. The downlink grant may be used at least for scheduling of the PDSCH within the same slot/subframe as the slot/subframe in which the downlink grant has been transmitted. The downlink assignment includes downlink control information such as a resource block allocation for the PDSCH, a Modulation and Coding Scheme (MCS) for the PDSCH, a NEW Data Indicator (NDI) indicating initial transmission or retransmission, information indicating an HARQ process number in the downlink, and a Redundancy version (RV) indicating information of redundancy bits added to codewords during turbo coding. The codeword is data resulting from error correction coding. The downlink assignment may include a Transmission Power Control (TPC) command for the PUCCH, a TPC command for the PUSCH, and TPC command for the Sounding Reference Signal (SRS). Note that, here, the "SRS" refers to a reference signal transmitted by the terminal apparatus to allow the base station apparatus to recognize the uplink channel state. The downlink assignment may include information about a trigger for the Aperiodic SRS. Note that the DCI format for each downlink data transmission includes information (fields) included in the above-described information and required for the intended use of the DCI format.

One uplink grant is used to notify the terminal apparatus of scheduling of one PUSCH within one serving cell. The uplink grant includes uplink control information such as information related to resource block allocation (resource block allocation and hopping resource allocation) for transmission of the PUSCH, information related to the MCS for the PUSCH (MCS/Redundancy version), the amount of cyclic shift applied to the DMRS, information related to retransmission of the PUSCH (NDI), a TPC command for the PUSCH, and a downlink Channel State Information (CSI) request (CSI request). The uplink grant may include information indicating the HARQ process number (also referred to as a Process Identifier (PID)) in the uplink, a Transmission Power Control (TPC) command for the PUCCH, and a TPC command for PUSCH. The HARQ Process number may include a field for notification in the DCI format, may be associated with a Radio Network Temporary Identifier (RNTI) described below, or may be associated with information about the DMRS. The uplink grant may include information about a trigger for the Aperiodic SRS. The uplink grant may include a Repetition number indicating the number of times that the PUSCH is repeatedly transmitted. Note that the DCI format for each uplink data transmission includes information (fields) included in the above-described information and required for the intended use of the DCI format.

The MCS for the PDSCH/PUSCH can use an index (MCS index) indicating a modulation order and a Transport Block Size (TBS) index for the PDSCH/PUSCH. The modulation order is associated with a modulation scheme. The modulation orders "2", "4", "6", "8", and "10" respectively indicate "QPSK," "16QAM," "64QAM," "256QAM," and "1024QAM." The TBS index is an index used to identify the transport block size for the PDSCH/PUSCH scheduled by the PDCCH. A communication system 1 (base station apparatus 10 and terminal apparatus 20) shares a table (transport block size table) that allows identification of the transport block size, based on the TBS index and the number of resource blocks allocated for the PDSCH/PUSCH transmission.

The PDCCH is generated by adding a Cyclic Redundancy Check (CRC) to the downlink control information. In the PDCCH, CRC parity bits are scrambled with a prescribed identifier (the scrambling is also referred to as an exclusive logical sum operation or masking). The parity bits are scrambled with a Cell-Radio Network Temporary Identifier (C-RNTI), a Semi Persistent Scheduling (SPS) C-RNTI, a Temporary C-RNTI, a Paging (P)-RNTI, a System Information (SI)-RNTI, or a Random Access (RA)-RNTI. The C-RNTI and the SPS C-RNTI are identifiers for identifying a terminal apparatus within a cell. The Temporary C-RNTI serves as an identifier for identifying the terminal apparatus that has transmitted a random access preamble during a contention based random access procedure. The C-RNTI and the Temporary C-RNTI are used to control PDSCH transmission or PUSCH transmission in a single subframe. The SPS C-RNTI is used to periodically allocate a resource for the PDSCH or the PUSCH. The P-RNTI is used to transmit a paging message (Paging Channel (PCH)). The SI-RNTI is used to transmit SIBs, and the RA-RNTI is used to transmit a random access response (message 2 in the random access procedure). Note that the identifier may include an RNTI for the grant free access. The RNTI for the grant free access may be one or both of an RNTI commonly used by specific multiple terminal apparatuses and an RNTI used by a specific terminal apparatus. The grant free access will be described below in detail. DCI provided with the CRC scrambled with the RNTI for the grant free access can be used for activation, deactivation, and parameter changes for the grant free access. The parameters can include resource configurations (DMRS configuration parameters, a radio resource for the grant free access, the MCS used for the grant free access, the number of repetitions, the presence or absence of frequency hopping, and the like).

PDSCH is used to transmit downlink data (a downlink transport block, DL-SCH). The PDSCH is used for transmission of system information messages (also referred to as System Information Blocks (SIBs)). Note that some or all of the SIBs can be included in the RRC message.

The PDSCH is used to transmit the RRC signaling. The RRC signaling transmitted from the base station apparatus may be common to multiple terminal apparatuses in the cell (specific to the cell). That is, the information common to the user equipment in the cell is transmitted by using cell-specific RRC signaling. The RRC signaling transmitted from the base station apparatus may be a dedicated message for a given terminal apparatus (also referred to as dedicated signaling). In other words, user equipment-specific (UE-Specific) information is transmitted by using a message dedicated to the given terminal apparatus.

The PDSCH is used to transmit the MAC CE. The RRC signaling and/or the MAC CE is also referred to as higher layer signaling. The PMCH is used to transmit multicast data (Multicast Channel (MCH)).

In the downlink radio communication in FIG. 1, a Synchronization signal (SS) and a Downlink Reference Signal (DL RS) are used as downlink physical signals.

The synchronization signal is used for the terminal apparatus to take synchronization in a frequency domain and a time domain in the downlink. The downlink reference signal is used for the terminal apparatus to perform channel estimation/channel compensation on the downlink physical channel. For example, the downlink reference signal is used to demodulate the PBCH, the PDSCH, and the PDCCH. The downlink reference signal can also be used for the terminal apparatus to measure the downlink channel state (CSI measurement). The downlink reference signal can include a Cell-specific Reference Signal (CRS), a Channel State Information Reference Signal (CSI-RS), a Discovery Reference Signal (DRS), and a Demodulation Reference Signal (DMRS).

The downlink physical channels and the downlink physical signals are also collectively referred to as a downlink signal. The uplink physical channel and the uplink physical signal are also collectively referred to as an uplink signal. The downlink physical channel and the uplink physical channel are also collectively referred to as a physical channel. The downlink physical signal and the uplink physical signal are also collectively referred to as a physical signal.

The BCH, the UL-SCH, and the DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing and the like are performed for each codeword.

Higher layer processing involves processing of a higher layer, such as the Medium Access Control (MAC) layer, a Packet Data Convergence Protocol (PDCP) layer, a Radio Link Control (RLC) layer, and the Radio Resource Control (RRC) layer, that is higher than the physical layer.

Higher layer processing is performed, the higher layer processing being processing for the layers higher than the physical layer such as the Medium Access Control (MAC) layer, the Packet Data Convergence Protocol (PDCP) layer, the Radio Link Control (RLC) layer, and the Radio Resource Control (RRC) layer.

A higher layer processing unit configures various RNTIs for respective terminal apparatuses. The RNTIs are used for encryption (scrambling) of the PDCCH, the PDSCH, or the like. The higher layer processing involves generating or acquiring, from a higher node, the downlink data (transport blocks or DL-SCH) allocated in the PDSCH, terminal apparatus-specific system information (System Information Blocks: SIBs), the RRC message, the MAC CE, and the like, and transmitting these data, information, and message. The higher layer processing involves managing various pieces of configuration information about the terminal apparatus 20. Note that some of the functions of radio resource control may be performed in the MAC layer or the physical layer.

The higher layer processing involves receiving, from the terminal apparatus 20, information related to the terminal apparatus, such as capabilities supported by the terminal apparatus (UE capabilities). The terminal apparatus 20 transmits the function of the terminal apparatus 20 itself to the base station apparatus 10 through higher layer signaling (RRC signaling). The information related to the terminal apparatus includes information indicating whether the terminal apparatus supports a prescribed function, or information indicating that the terminal apparatus has completed introduction and testing of a prescribed function. The information indicating whether the prescribed function is supported includes information indicating whether the introduction and testing of the prescribed function have been completed.

In a case that the terminal apparatus supports the prescribed function, the terminal apparatus transmits information (parameters) indicating whether the prescribed function is supported. In a case that the terminal apparatus does not support the prescribed function, the terminal apparatus need not transmit information (parameters) indicating whether the prescribed function is supported. In other words, whether the prescribed function is supported is reported by whether information (parameters) indicating whether the prescribed function is supported is transmitted. The information (parameters) indicating whether the prescribed function is supported may be reported using one bit of 1 or 0.

In FIG. 1, the base station apparatus 10 and the terminal apparatuses 20 support, in the uplink, Multiple Access (MA) using grant free access (also referred to as grant less access, Contention-based access, or Autonomous access). The grant free access refers to a method in which the terminal apparatus transmits uplink data (such as a physical uplink channel) without performing a procedure of specification of a physical resource and transmission timings for data transmission based on SR transmission performed by the terminal apparatus and an UL Grant provided by the base station apparatus using DCI (also referred to as UL Grant using L1 signaling). Thus, the terminal apparatus can receive in advance a physical resource and transmission parameters that can be used for the grant free access, and perform data transmission by using a configured physical resource only in a case that the transmission data is in a buffer.

Three types of grant free access described below are available. A first type is a method in which the base station apparatus transmits transmission parameters related to the grant free access to the terminal apparatus through higher layer signaling (for example, RRC), and further transmits, also through higher layer signaling, start of allowing (activation) and end of allowing (deactivation) the grant free access data transmission and transmission parameter changes. Here, the transmission parameters related to the grant free access may include a physical resource (time and frequency resources) usable for the grant free access data transmission, MCS, the presence or absence of repeated transmissions, the number of repetitions, the presence or absence of frequency hopping, a hopping pattern, the configuration of the DMRS (cyclic shift, OCC, and the like), and information about configurations related to the TPC. The transmission parameters related to the grant free access and the start of allowing the data transmission may be configured simultaneously, or after the transmission parameters related to the grant free access are configured, the start of allowing the grant free access data transmission may be configured at a different timing. In a second type, the base station apparatus transmits the transmission parameters related to the grant free access to the terminal apparatus through higher layer signaling (for example, RRC), and transmits, in DCI (L1 signaling), the start of allowing (activation) and end of allowing (deactivation) the grant free access data transmission and transmission parameter changes. Here, the start of the allowing (activation) through the DCI need not include a physical resource that can be used for the grant free access (allocation of resource blocks). In a third type, the base station apparatus transmits the transmission parameters related to the grant free access to the terminal apparatus through higher layer signaling (for example, RRC), and further transmits, through higher layer signaling, the start of allowing (activation) and end of allowing (deactivation) the grant free access data transmission, while transmitting only transmission parameter changes in the DCI (L1 signaling). The transmission parameters related to the grant free access and the start of allowing the data transmission may be configured simultaneously, or after the transmission parameters related to the grant free access are configured, the start of allowing the grant free access data transmission may be configured at a different timing. One aspect of the present invention may be applied to any of the types of grant free access described above.

On the other hand, the technique referred to as Semi-Persistent Scheduling (SPS) has been introduced in LTE, which allows periodic resource allocation primarily for Voice over Internet Protocol (VoIP) applications. In SPS, the DCI is used to perform the start of the allowing (activation) through a UL Grant including the transmission parameters such as designation of physical resource (allocation of resource blocks) and the MCS. Thus, the two types that perform the start of allowing (activation) the grant free access through higher layer signaling (e.g., RRC) differ in SPS and a start procedure. The one type that performs the start of allowing (activation) the grant free access through the DCI (L1 signaling) may differ in that no physical resource (allocation of resource blocks) available for the start of the allowing (activation) is included. The base station apparatus may use different types of RNTI for scrambling, for the DCI (L1 signaling) used for the grant free access and for the DCI used for SPS.

The base station apparatus 10 and the terminal apparatuses 20 may support non-orthogonal multi-access in addition to orthogonal multi-access. Note that the base station apparatus 10 and the terminal apparatuses 20 can support both the grant free access and scheduled access. Here, the "scheduled access" refers to the terminal apparatus 20 performing data transmission according to the following procedure. The terminal apparatus 20 uses Random Access Procedure and SR to request, to the base station apparatus 10, a radio resource for transmitting uplink data. The base station apparatus provides a UL Grant in the DCI to each terminal apparatus based on the RACH or SR. In a case of receiving a UL Grant for control information from the base station apparatus, the terminal apparatus transmits uplink data using a prescribed radio resource, based on uplink transmission parameters included in the UL Grant.

The downlink control information for physical channel transmission in the uplink may include a shared field shared between the scheduled access and the grant free access. In this case, in a case that the base station apparatus 10 indicates transmission of the uplink physical channel using the grant free access, the base station apparatus 10 and the terminal apparatus 20 interpret a bit sequence stored in the shared field in accordance with a configuration for the grant free access (e.g., a look-up table defined for the grant free access). Similarly, in a case that the base station apparatus 10 indicates transmission of the uplink physical channel using the scheduled access, the base station apparatus 10 and the terminal apparatus 20 interpret the shared field in accordance with a configuration for the scheduled access. Transmission of the uplink physical channel in the grant free access is referred to as Asynchronous data transmission. Note that the transmission of the uplink physical channel in the scheduled is referred to as Synchronous data transmission.

In the grant free access, the terminal apparatus 20 may randomly select a radio resource for transmission of uplink data. For example, the terminal apparatus 20 has been notified, by the base station apparatus 10, of multiple candidates for available radio resources as a resource pool, and randomly selects a radio resource from the resource pool. In the grant free access, the radio resource in which the terminal apparatus 20 transmits the uplink data may be configured in advance by the base station apparatus 10. In this case, the terminal apparatus 20 transmits the uplink data by using the radio resource configured in advance without receiving the UL Grant in the DCI (including a specified physical resource). The radio resource includes multiple uplink multi-access resources (resources to which the uplink data can be mapped). The terminal apparatus 20 transmits the uplink data by using one or more uplink multi-access resources selected from the multiple uplink multi-access resources. Note that the radio resource in which the terminal apparatus 20 transmits the uplink data may be predetermined in the communication system including the base station apparatus 10 and the terminal apparatus 20. The radio resource for transmission of the uplink data may be notified to the terminal apparatus 20 by the base station apparatus 10 using a physical broadcast channel (e.g., Physical Broadcast Channel (PBCH)/Radio Resource Control (RRC)/system information (e.g. System Information Block (SIB)/physical downlink control channel (downlink control information, e.g., Physical Downlink Control Channel (PDCCH), Enhanced PDCCH (EPDCCH), MTC PDCCH (MPDCCH), Narrowband PDCCH (NPDCCH).

In the grant free access, the uplink multi-access resource includes a multi-access physical resource and a Multi-Access Signature Resource. The multi-access physical resource is a resource including time and frequency. The multi-access physical resource and the multi-access signature resource may be used to identify the uplink physical channel transmitted by each terminal apparatus. The resource blocks are units to which the base station apparatus 10 and the terminal apparatus 20 are capable of mapping the physical channel (e.g., the physical data shared channel or the physical control channel). Each of the resource blocks includes one or more subcarriers (e.g., 12 subcarriers or 16 subcarriers) in a frequency domain.

The multi-access signature resource includes at least one multi-access signature of multiple multi-access signature groups (also referred to as multi-access signature pools). The multi-access signature is information indicating a characteristic (mark or indicator) that distinguishes (identifies) the uplink physical channel transmitted by each terminal apparatus. Examples of the multi-access signature include a spatial multiplexing pattern, a spreading code pattern (a Walsh code, an Orthogonal Cover Code (OCC), a cyclic shift for data spreading, the sparse code, or the like), an interleaved pattern, a demodulation reference signal pattern (a reference signal sequence, the cyclic shift, the OCC, or IFDM)/an identification signal pattern, and transmit power, at least one of which is included in the multi-access signature. In the grant free access, the terminal apparatus 20 transmits the uplink data by using one or more multi-access signatures selected from the multi-access signature pool. The terminal apparatus 20 can notify the base station apparatus 10 of available multi-access signatures. The base station apparatus 10 can notify the terminal apparatus of a multi-access signature used by the terminal apparatus 20 to transmit the uplink data. The base station apparatus 10 can notify the terminal apparatus 20 of an available multi-access signature group by the terminal apparatus 20 to transmit the uplink data. The available multi-access signature group may be notified by using the broadcast channel/RRC/system information/downlink control channel. In this case, the terminal apparatus 20 can transmit the uplink data by using a multi-access signature selected from the notified multi-access signature group.

The terminal apparatus 20 transmits the uplink data by using a multi-access resource. For example, the terminal apparatus 20 can map the uplink data to a multi-access resource including a multi-carrier signature resource including one multi-access physical resource, a spreading code pattern, and the like. The terminal apparatus 20 can allocate the uplink data to a multi-access resource including a multi-carrier signature resource including one multi-access physical resource and an interleaved pattern. The terminal apparatus 20 can also map the uplink data to a multi-access resource including a multi-access signature resource including one multi-access physical resource and a demodulation reference signal pattern/identification signal pattern. The terminal apparatus 20 can also map the uplink data to a multi-access resource including one multi-access physical resource and a multi-access signature resource including a transmit power pattern (e.g., the transmit power for each of the uplink data may be configured to cause a difference in receive power at the base station apparatus 10) In such grant free access, the communication system of the present embodiment may allow the uplink data transmitted by the multiple terminal apparatuses 20 to be transmitted overlapping with (being superimposed on, being spatially or non-orthogonally multiplexed with, or colliding with) one another in the uplink multi-access physical resource.

The base station apparatus 10 detects, in the grant free access, a signal of the uplink data transmitted by each terminal apparatus. To detect the uplink data signal, the base station apparatus 10 may include Symbol Level Interference Cancellation (SLIC) in which interference is canceled based on a demodulation result for an interference signal, Codeword Level Interference Cancellation (CWIC, also referred to as Sequential Interference Canceler (SIC) or Parallel Interference Canceler (PIC)) in which interference is canceled based on the decoding result for the interference signal, turbo equalization, maximum likelihood detection (MLD, Reduced complexity maximum likelihood detection (R-MLD)) in which transmit signal candidates are searched for the most probable signal, Enhanced Minimum Mean Square Error-Interference Rejection Combining (EMMSE-IRC) in which interference signals are suppressed by linear computation, signal detection based on message passing (Belief propagation (BP), Matched Filter (MF)-BP in which a matched filter is combined with BP, or the like. Note that, in the following description, a case is described in which the base station apparatus 10 detects, in the grant free access, a non-orthogonally multiplexed uplink data signal by applying an Advanced Receiver with turbo equalization or the like but that the present embodiment is not limited to this configuration so long as an uplink data signal can be detected. For example, 1—Tap MMSE may be used that does not use a matched filter such as Maximal Ratio Combining (MRC) or an interference canceller.

Figure 2:
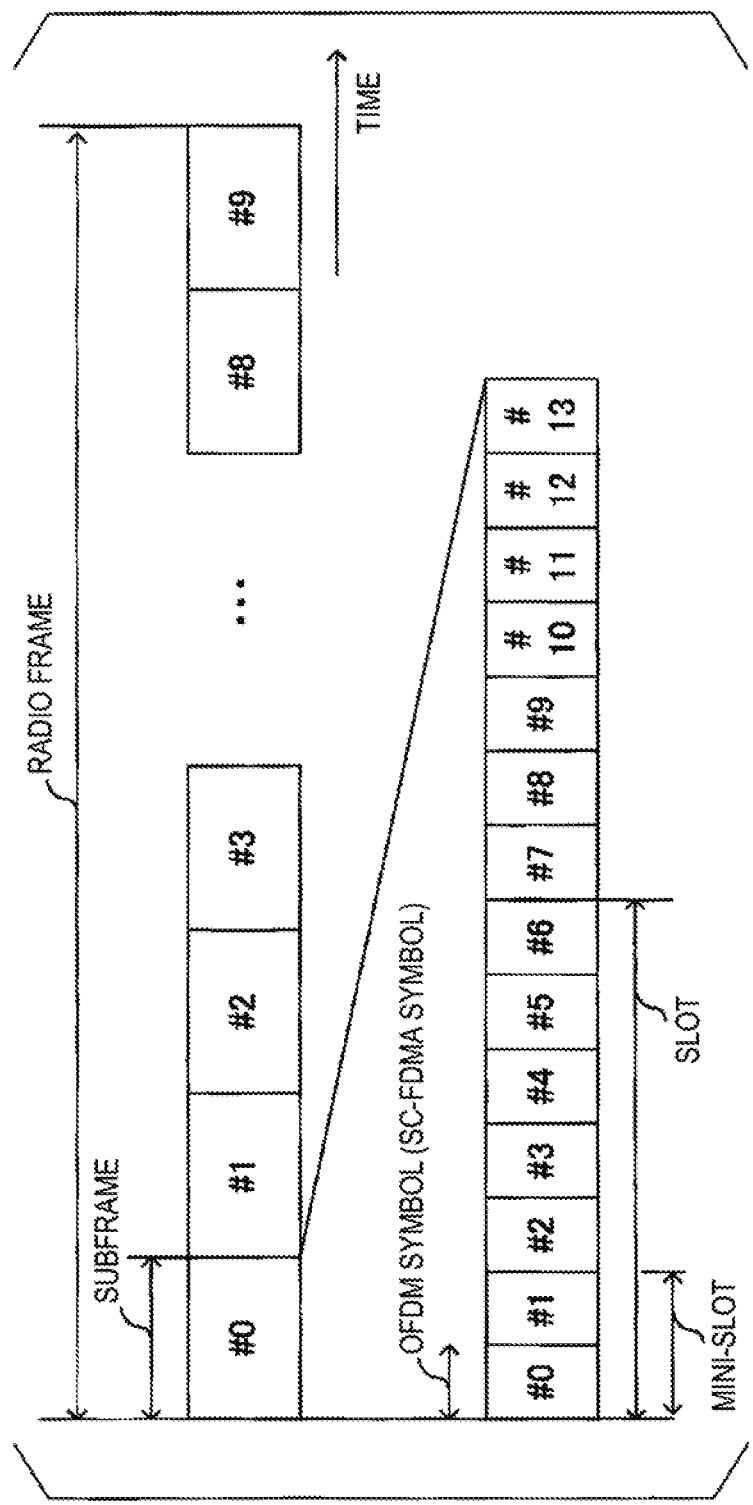
FIG. 2 is a diagram illustrating an example of a radio frame configuration for the communication system according to the first embodiment.

FIG. 2 is a diagram illustrating an example of a radio frame configuration for a communication system according to the present embodiment. The radio frame configuration indicates a configuration of multi-access physical resources in a time domain. One radio frame includes multiple subframes. FIG. 2 is an example in which one radio frame includes 10 subframes. The terminal apparatus 20 has a subcarrier spacing used as a reference (reference numerology). The subframe includes multiple OFDM symbols generated at the subcarrier spacings used as the reference. FIG. 2 is an example in which one subframe includes 14 OFDM symbols.

One slot includes multiple OFDM symbols generated at subcarrier spacings used for uplink data transmission by the terminal apparatus 20. FIG. 2 is an example in which one slot includes seven OFDM symbols. FIG. 2 illustrates a case where the subcarrier spacing used as the reference is the same as a subcarrier spacing used for the uplink data transmission. In this case, one subframe includes multiple slots. FIG. 2 is an example in which one subframe includes two slots. The communication system according to the present embodiment may use slots as minimum units to which the terminal apparatus 20 maps the physical channel (e.g., the physical data shared channel or the physical control channel). In this case, in the multi-access physical resource, one slot is defined as a resource block unit in the time domain. Furthermore, in the communication system according to the present embodiment, the minimum unit in which the terminal apparatus 20 maps the physical channel may be one or more OFDM symbols (e.g., two to seven OFDM symbols). The base station apparatus 10 use one or more OFDM symbols as a resource block unit in the time domain. The base station apparatus 10 may signal, to the terminal apparatus 20, the minimum unit in which the physical channel is mapped.

Figure 3:
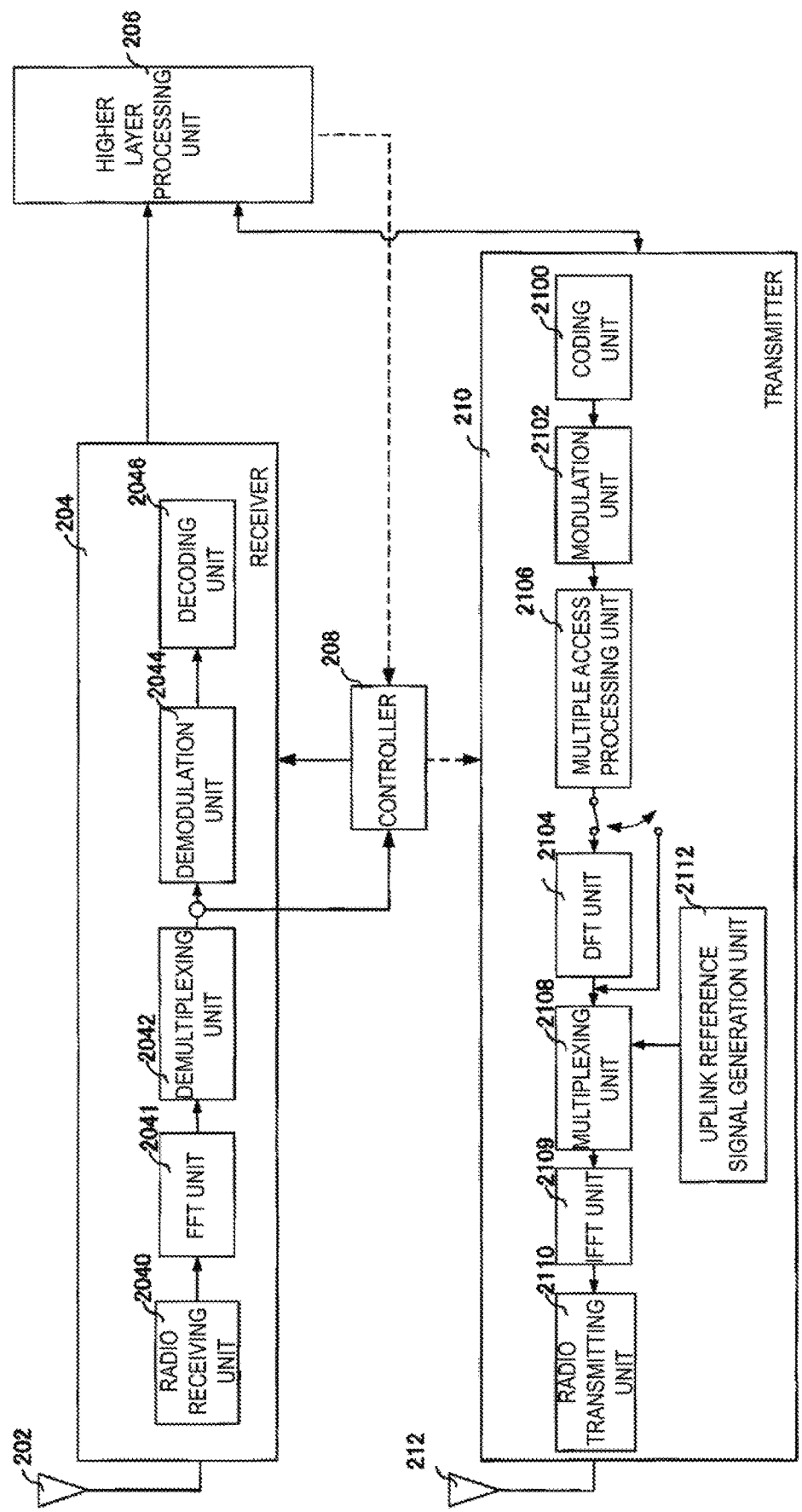
FIG. 3 is a schematic block diagram illustrating a configuration of a terminal apparatus 20 according to the first embodiment.

FIG. 3 is a schematic block diagram illustrating a configuration of the terminal apparatus 20 according to the present embodiment. The terminal apparatus 20 includes a receive antenna 202, a receiver (receiving step) 204, a higher layer processing unit (higher layer processing step) 206, a controller (control step) 208, a transmitter (transmitting step) 210, and a transmit antenna 212. The receiver 204 includes a radio receiving unit (radio receiving step) 2040, an FFT unit 2041 (FFT step), a demultiplexing unit (demultiplexing step) 2042, a demodulation unit (demodulating step) 2044, and a decoding unit (decoding step) 2046. The transmitter 210 includes a coding unit (coding step) 2100, a modulation unit (modulation step) 2102, a DFT unit (DFT step) 2104, a multiple access processing unit (multiple access processing step) 2106, a multiplexing unit (multiplexing step) 2108, a radio transmitting unit (radio transmitting step) 2110, a IFFT unit (IFFT step) 2109, and an uplink reference signal generation unit (uplink reference signal generation step) 2112.

The receiver 204 demultiplexes, demodulates, and decodes a downlink signal (downlink physical channel, downlink physical signal) received from the base station apparatus 10 via the receive antenna 202. The receiver 204 outputs a control channel (control information) separated from the received signal to the controller 208. The receiver 204 outputs a decoding result to the higher layer processing unit 206. The receiver 204 acquires information related to a configuration of the uplink physical channel and the uplink reference signal included in the received signal (referred to as configuration information related to uplink transmission). The configuration information related to the uplink transmission includes configuration information related to the grant free access. The downlink signal may include the UE ID of the terminal apparatus 20.

The radio receiving unit 2040 converts, by down-conversion, a downlink signal received through the receive antenna 202 into a baseband signal, removes unnecessary frequency components from the baseband signal, controls an amplification level in such a manner as to suitably maintain a signal level, orthogonally demodulates the signal based on an in-phase component and an orthogonal component of the received signal, and converts the resulting orthogonally-demodulated analog signal into a digital signal. The radio receiving unit 2040 removes a portion of the digital signal resulting from the conversion, the portion corresponding to a Cyclic Prefix (CP). The FFT unit 2041 performs a fast Fourier transform on the downlink signal from which CP has been removed (demodulation processing for OFDM modulation), and extracts the signal in the frequency domain.

The demultiplexing unit 2042 separates and extracts the downlink physical channel (physical downlink control channel, physical downlink shared channel, physical broadcast channel, or the like), the downlink reference signal, and the like included in the extracted downlink signal in the frequency domain. The demultiplexing unit 2042 includes a channel measurement function (channel measurement unit) using the downlink reference signal. The demultiplexing unit 2042 includes a channel compensation function (channel compensation unit) for the downlink signal using the channel measurement result. The demultiplexing unit outputs the physical downlink channel to the demodulation unit 2044/controller 208.

The demodulation unit 2044 demodulates the received signal by using, for each of the modulation symbols of each downlink physical channel, a predetermined modulation scheme or a modulation scheme notified in advance with the downlink grant, such as BPSK, QPSK, 16QAM, 64QAM, or 256QAM.

The decoding unit 2046 decodes coded bits of each of the demodulated downlink physical channels at a predetermined coding rate of a predetermined coding scheme or at a coding rate notified in advance with the downlink grant, and outputs the decoded downlink data/configuration information related to the downlink reception/configuration information related to the uplink transmission to the higher layer processing unit 206.

The controller 208 controls the receiver 204 and the transmitter 210 by using the configuration information related to the downlink reception/configuration information related to the uplink transmission included in the downlink physical channel (physical downlink control channel, physical downlink shared channel, or the like). The configuration information related to the uplink transmission can include configuration information related to the grant free access. The controller 208 controls the uplink reference signal generation unit 2112 and the multiple access processing unit 2106 in accordance with the configuration information related to multi-access resources (multi-access physical resources/multi-access signature resources) included in the configuration information related to the grant free access. In FIG. 3, the controller 208 controls the uplink reference signal generation unit 2112 and the multiple access processing unit 2106 in accordance with parameters and multi-access signature resources used to generate the demodulation reference signal/identification signal calculated from the configuration information related to the grant free access. The controller 208 acquires the configuration information related to the downlink reception and/or the configuration information related to the uplink transmission from the receiver 204/higher layer processing unit 206. The configuration information related to the downlink reception/configuration information related to the uplink transmission may be acquired from the downlink control information (DCI) included in the downlink physical channel. The configuration information related to the downlink reception/configuration information related to the uplink transmission may be acquired from the downlink control information (DCI) included in the downlink physical channel. The configuration information related to the grant free access may be included in the physical downlink control channel/physical downlink shared channel/broadcast channel. The downlink physical channel may include a physical channel dedicated to the grant free access. In this case, a portion or all of the configuration information related to the grant free access may be acquired from the physical channel dedicated to the grant free access. Note that, in a case that the transmitter 210 transmits the physical uplink control channel, the controller 208 generates Uplink Control information (UCI) and outputs the resultant information to the transmitter 210. Note that some of the functions of the controller 108 can be included in the higher layer processing unit 102. Note that, in a case that the transmitter 210 transmits the physical uplink control channel, switching of whether the DFT is to be applied may be performed by the controller 208. Note that the controller 208 may control the transmitter 210 in accordance with the parameter of the CP length added to the data signal. The controller 208 may vary the CP length between the grant free access and the scheduled access such that, e.g., the CP for the grant free access is longer than the CP for the scheduled access. The controller 208 may control the transmitter 210 in accordance with the CP length parameter included in the configuration information related to the grant free access. Note that, in a case that the DFT is applied, a Zero-Tail DFTS-OFDM signal waveform may be used in which zero is interpolated at the head/tail of a signal sequence before the sequence is input to the DFT. In a case that the DFT is applied, a UW-DFTS-OFDM signal waveform may be used in which a specific sequence such as a Zadoff-Chu sequence is interpolated at the head/tail of a signal sequence before the sequence is input to the DFT. The DFTS-OFDM may be used in a case that a carrier frequency is lower than a prescribed value, and the Zero-Tail DFTS-OFDM/UW-DFTS-OFDM may be used in a case that the carrier frequency is higher than the prescribed value.

The controller 208 inputs, to the transmitter 210, information related to a resource used for the grant free access detected by the receiver 204. The information related to the resource used for the grant free access may be notified on the physical downlink control channel/physical downlink shared channel/broadcast channel. The information related to the resource used for the grant free access will be described below in detail.

The higher layer processing unit 206 performs processing of the medium access control (MAC) layer, the packet data convergence protocol (PDCP) layer, the radio link control (RLC) layer, and the radio resource control (RRC) layer. The higher layer processing unit 206 outputs, to the transmitter 210, information related to a function of the terminal apparatus (UE capability) supported by the terminal apparatus itself. For example, the higher layer processing unit 206 signals, in the RRC layer, information related to the function of the terminal apparatus.

The information related to the function of the terminal apparatus includes information indicating whether the terminal apparatus supports a prescribed function, or information indicating that the terminal apparatus has completed introduction and testing of a prescribed function. The information indicating whether the prescribed function is supported includes information indicating whether the introduction and testing of the prescribed function have been completed. In a case that the terminal apparatus supports the prescribed function, the terminal apparatus transmits information (parameters) indicating whether the prescribed function is supported. In a case that the terminal apparatus does not support the prescribed function, the terminal apparatus may be configured not to transmit information (parameters) indicating whether the prescribed function is supported. In other words, whether the prescribed function is supported is reported by whether information (parameters) indicating whether the prescribed function is supported is transmitted. The information (parameters) indicating whether the prescribed function is supported may be reported using one bit of 1 or 0.

The information related to the function of the terminal apparatus includes information indicating that the grant free access is supported. In a case that multiple functions corresponding to the grant free access are provided, the higher layer processing unit 206 can transmit information indicating whether the grant free access is supported on a function-by-function basis. The information indicating that the grant free access is supported includes information indicating the multi-access physical resource and multi-access signature resource supported by the terminal apparatus. The information indicating that the grant free access is supported may include a configuration of a lookup table for the configuration of the multi-access physical resource and the multi-access signature resource. The information indicating that the grant free access is supported may include some or all of an antenna port, a capability corresponding to multiple tables indicating a scrambling identity and the number of layers, a capability corresponding to a prescribed number of antenna ports, and a capability corresponding to a prescribed transmission mode. The transmission mode is determined by the number of antenna ports, transmission diversity, the number of layers, and whether support of the grant free access and the like are provided.

The higher layer processing unit 206 manages various types of configuration information about the terminal apparatus. Some of the various types of configuration information are input to the controller 208. The various types of configuration information are received from the base station apparatus 10 via the receiver 204 using the downlink physical channel. The various types of configuration information include configuration information related to the grant free access input from the receiver 204. The configuration information related to the grant free access includes configuration information about the multi-access resources (multi-access physical resources and multi-access signature resources). For example, the configuration information related to the grant free access may include a configuration related to the multi-access signature resource (configuration related to processing performed based on a mark for identifying the uplink physical channel transmitted by the terminal apparatus 20), such as an uplink resource block configuration (the number of OFDM symbols per resource block/the number of subcarriers), a configuration of the demodulation reference signal/identification signal (reference signal sequence, cyclic shift, OFDM symbols to be mapped, and the like), a spreading code configuration (Walsh code, Orthogonal Cover Code (OCC), sparse code, spreading rates of these spreading codes, and the like), an interleave configuration, a transmit power configuration, a transmit and/or receive antenna configuration, and a transmit and/or receive beamforming configuration. These multi-access signature resources may be directly or indirectly associated (linked) with one another. The association of the multi-access signature resources is indicated by a multi-access signature process index. The configuration information related to the grant free access may include the configuration of the look-up table for the configuration of the multi-access physical resource and multi-access signature resource. The configuration information related to the grant free access may include setup of the grant free access, information indicating release, ACK/NACK reception timing information for uplink data signals, retransmission timing information for uplink data signals, and the like.

Based on the configuration information related to the grant free access, the higher layer processing unit 206 manages multi-access resources (multi-access physical resources, multi-access signature resources) in which uplink data (transport blocks) is transmitted in a grant-free. Based on the configuration information related to the grant free access, the higher layer processing unit 206 outputs, to the controller 208, information used to control the transmitter 210. The higher layer processing unit 206 acquires the UE ID of the terminal apparatus itself from the receiver 204/controller 208. The UE ID can also be included in configuration information related to the grant free access.

The higher layer processing unit 206 outputs, to the transmitter 210, uplink data (e.g., UL-SCH) generated. The higher layer processing unit 206 can also output, to the transmitter 210, uplink data generated without intervention of a user operation (for example, data acquired by the sensor). The uplink data may include a field storing the UE ID. The higher layer processing unit 206 adds the CRC to the uplink data. CRC parity bits are generated using the uplink data. The CRC parity bits are scrambled with the UE ID allocated to the terminal apparatus itself (the scrambling is also referred to as an exclusive-OR operation, masking, or ciphering). As the UE ID, a terminal apparatus-specific identifier for the grant free access may be used.

In a case that uplink data to be transmitted is generated, the transmitter 210 transmits the physical uplink shared channel without receiving the UL Grant, based on the configuration information related to the grant free access and transmitted from the base station apparatus 10. In a case of having received the resource for data transmission through the UL Grant, the transmitter 210 may transmit the physical uplink shared channel through scheduled access. The transmitter 210 generates a physical uplink shared channel and a demodulation reference signal/identification signal associated with the physical uplink shared channel in accordance with the configuration related to the grant free access/scheduled access and input from the controller 208.

The coding unit 2100 codes the uplink data input from the higher layer processing unit 206 by using the predetermined coding scheme/coding scheme configured by the controller 208 (the coding includes repetitions). The coding scheme may involve application of convolutional coding, turbo coding, Low Density Parity Check (LDPC) coding, Polar coding, and the like. The LDPC code may be used for data transmission, whereas the Polar code may be used for transmission of the control information. Different error correction coding may be used depending on the uplink channel to be used. Different error correction coding may be used depending on the size of the data or control information to be transmitted. For example, the convolution code may be used in a case that the data size is smaller than a prescribed value, and otherwise the correction coding described above may be used. For the coding described above, in addition to a coding rate of $\frac{1}{3}$, a mother code such as a low coding rate of $\frac{1}{6}$ or $\frac{1}{12}$ may be used. In a case that a coding rate higher than the mother code is used, the coding rate used for data transmission may be achieved by rate matching (puncturing). The modulation unit 2102 modulates coded bits input from the coding unit 2100, in compliance with a modulation scheme notified in the downlink control information or a modulation scheme predetermined for each channel, such as BPSK, QPSK, 16QAM, 64QAM, or 256QAM (the modulation scheme may include $\pi/2$ shift BPSK or $\pi/4$ shift QPSK).

The multiple access processing unit 2106 performs signal conversion such that the base station apparatus 10 can achieve signal detection even in a case that multiple data are multiplexed on a sequence output from the modulation unit 2102 in accordance with multi-access signature resource input from the controller 208. In a case that the multi-access signature resource is configured as spreading, multiplication by the spreading code sequence is performed according to the configuration of the spreading code sequence. The configuration of the spreading code sequence may be associated with other configurations of the grant free access such as the demodulation reference signal/identification signal. Note that the multiple access processing may be performed on the sequence after the DFT processing. Note that, in a case that interleaving is configured as a multi-access signature resource in the multiple access processing unit 2106, the multiple access processing unit 2106 can be replaced with the interleave unit. The interleave unit performs interleave processing on the sequence output from the DFT unit in accordance with the configuration of the interleave pattern input from the controller 208. In a case that code spreading and interleaving are configured as a multi-access signature resource, the multiple access processing unit 2106 of the transmitter 210 performs spreading processing and interleaving. A similar operation is performed even in a case that any other multi-access signature resource is applied, and the sparse code or the like may be applied.

The multiple access processing unit 2106 inputs the multiple-access-processed signal to the DFT unit 2104 or the multiplexing unit 2108 depending on whether a DFTS-OFDM signal waveform or an OFDM signal waveform is used. In a case that the DFTS-OFDM signal waveform is used, the DFT unit 2104 rearranges multiple-access-processed modulation symbols output from the multiple access processing unit 2106 in parallel and then performs Discrete Fourier Transform (DFT) processing on the rearranged modulation symbols. Here, a zero symbol sequence may be added to the modulation symbols, and the DFT may then be performed to provide a signal waveform in which, instead of a CP, a zero interval is used for a time signal resulting from IFFT. A specific sequence such as Gold sequence or a Zadoff-Chu sequence may be added to the modulation symbols, and the DFT may then be performed to provide a signal waveform in which, instead of a CP, a specific pattern is used for the time signal resulting from the IFFT. In a case that the OFDM signal waveform is used, the DFT is not applied, and thus the multiple-access-processed signal is input to the multiplexing unit 2108. The controller 208 performs control using a configuration of the zero symbol sequence (the number of bits in the symbol sequence and the like) and a configuration of the specific sequence (sequence seed, sequence length, and the like), the configurations being included in the configuration information related to the grant free access.

The uplink reference signal generation unit 2112 generates a demodulation reference signal in accordance with the configuration information about the demodulation reference signal input from the controller 208. In a case of an SRS transmission timing notified by the base station apparatus, the uplink reference signal generation unit 2112 generates an SRS based on SRS transmission parameters. Details will be described below. The configuration information about the demodulation reference signal/identification signal may be associated with a configuration related to the grant free access (configuration related to the multi-access physical resource/multi-access signature resource). The configuration information about the demodulation reference signal/identification signal is used to generate a sequence acquired according to a predetermined rule (e.g., Equation (1)), based on a physical cell identifier (also referred to as a physical cell identity (PCI), a Cell ID, or the like) for identifying the base station apparatus 10, the number of subcarriers (bandwidth) to which the uplink reference signal is mapped, the number of OFDM symbols, the cyclic shift, the OCC sequence, and the like.

The multiplexing unit 2108 multiplexes (maps) the uplink physical channel signal (output signal from the DFT unit 2104) and the uplink reference signal for each transmit antenna port. The multiplexing unit 2108 maps the uplink physical channel and the uplink reference signal to resource elements for each transmit antenna port. In a case that the SCMA is used, the multiplexing unit 2108 maps the uplink physical channel to resource elements in accordance with an SCMA resource pattern input from the controller 208. The SCMA resource pattern may be included in the configuration information related to the grant free access.

The IFFT unit 2109 performs the Inverse Fast Fourier Transform (IFFT) on the multiplexed signal to perform DFTS-OFDM (SC-FDMA) modulation or OFDM modulation to generate SC-FDMA symbols or OFDM symbols. The radio transmitting unit 2110 adds CPs to the SC-FDMA symbols to generate a baseband digital signal. Furthermore, the radio transmitting unit 2110 converts the baseband digital signal into an analog signal, removes the excess frequency components from the analog signal, converts the signal into a carrier frequency by up-conversion, performs power amplification, and transmits the resultant signal to the base station apparatus 10 via the transmit antenna 212. The radio transmitting unit 2110 includes a transmission power control function (transmission power control unit). The transmission power control follows configuration information about the transmit power input from the controller 208. The configuration information about the transmit power is associated with the configuration information related to the grant free access. In a case that FBMC, UF-OFDM, or F-OFDM are applied, filtering is performed on the SC-FDMA symbols (or OFDM symbols) in units of subcarriers or sub-bands.

In the grant free access data transmission, the terminal apparatus 20 can perform at least one of mMTC data transmission (hereinafter referred to as mMTC transmission) satisfying at least one of data for which a long latency is acceptable and data not requiring very high reliability, and URLLC data transmission (hereinafter referred to as URLLC transmission) requiring low latency and high reliability. The mMTC transmission may be transmission of data for which a long latency is acceptable, and the URLLC transmission may be transmission of data for which low latency is required. The mMTC transmission and the URLLC transmission may be data transmission based on mMTC configuration information (parameters and configuration information) and data transmission based on URLLC configuration information (parameters and configuration information). At least one of the following may be configured separately for the mMTC configuration information and for the URLLC configuration information: a data size, the number of retransmissions, a bandwidth used for the data transmission, a transmit power parameter, a data format (frame structure), the number of OFDM symbols used for a single data transmission, a subcarrier spacing, a carrier frequency used for the data transmission, the number of antenna ports/physical antennas used for the data transmission, a modulation order and a coding rate used for the data transmission, and the error correction coding scheme. The mMTC transmission and the URLLC transmission may be data transmission on a dedicated physical resource for mMTC and data transmission on a dedicated physical resource for the URLLC. The mMTC transmission and the URLLC transmission may be data transmission on a dedicated multi-access signature resource for mMTC and data transmission on a dedicated multi-access signature resource for the URLLC.

Figure 4:
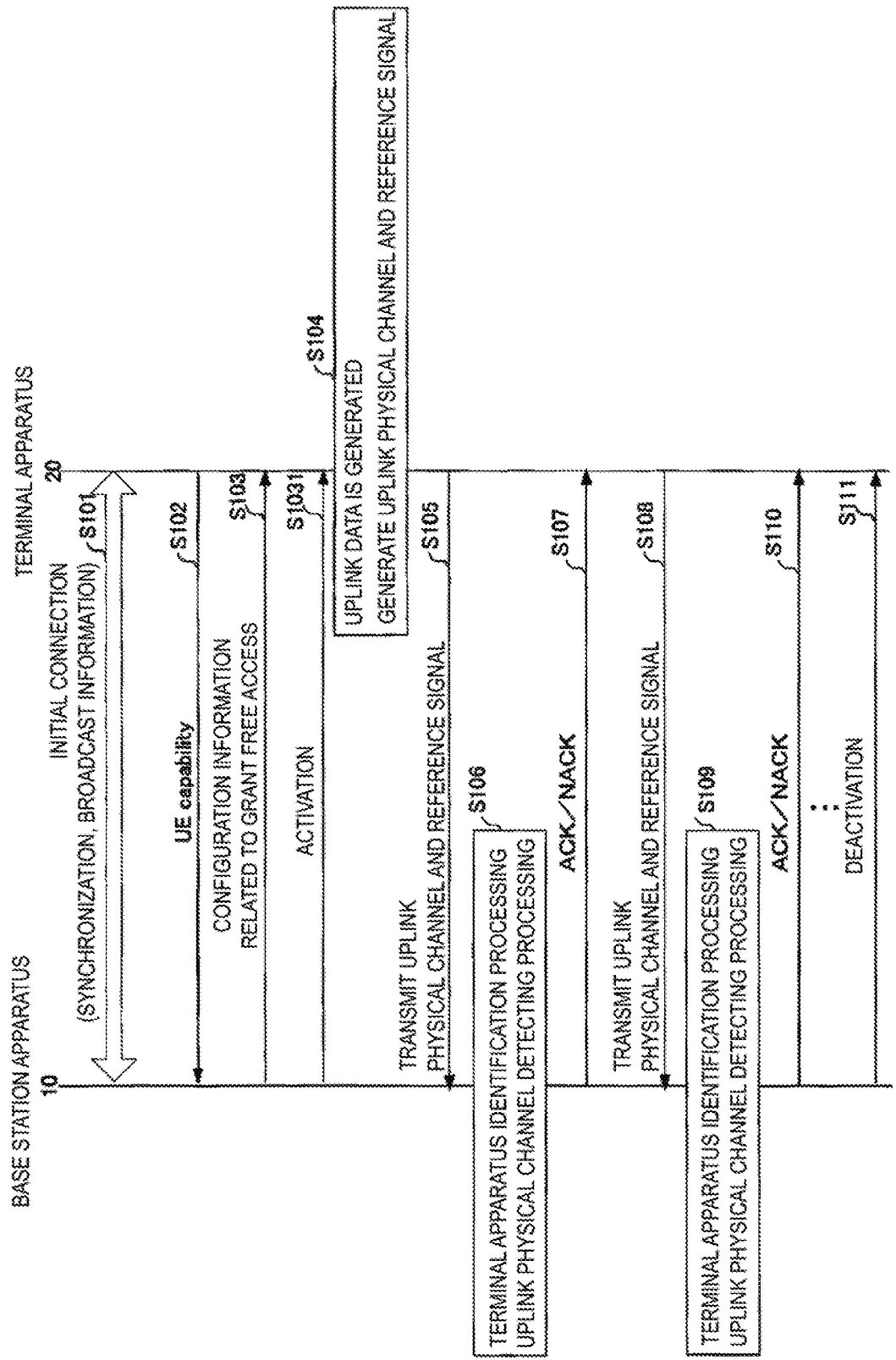
FIG. 4 is a diagram illustrating an example of a sequence between a base station apparatus and a terminal apparatus in grant free access according to the first embodiment.

FIG. 4 is a diagram illustrating an example of a sequence between the base station apparatus and the terminal apparatus in the grant free access according to the present embodiment. The base station apparatus 10 periodically transmits a synchronization signal and a broadcast channel in accordance with a prescribed radio frame format in the downlink. The terminal apparatus 20 performs an initial connection by using the synchronization signal, the broadcast channel, and the like (S101). The terminal apparatus 20 performs frame synchronization and symbol synchronization in the downlink by using the synchronization signal. In a case that the broadcast channel includes the configuration information related to the grant free access, the terminal apparatus 20 acquires the configuration related to the grant free access in the connected cell. The base station apparatus 10 can notify each terminal apparatus 20 of the UE ID in the initial connection.

The terminal apparatus 20 transmits the UE Capability (S102). The base station apparatus 10 can identify, by using the UE Capability, whether the terminal apparatus 20 supports the grant free access. Note that in S101 to S103, the terminal apparatus 20 can transmit the physical random access channel to acquire resources for uplink synchronization and an RRC connection request.

The base station apparatus 10 transmits the configuration information related to the grant free access to each of the terminal apparatuses 20 by using the RRC messages, the SIB, or the like (S103). The configuration information related to the grant free access includes the allocation of the multi-access signature resource. The terminal apparatus 20 having received the configuration information related to the grant free access acquires a transmission parameter such as the multi-access signature resource applied to the uplink data. Note that a portion or all of the configuration information related to the grant free access may be notified using the downlink control information. Furthermore, the base station apparatus 10 notifies the terminal apparatus 20 of activation of permission for the grant free access data transmission by using one of the RRC message, SIBs, and DCI (L1 signaling) (S1031).

The terminal apparatus 20 supporting the grant free access generates a demodulation reference signal allocated to the terminal itself in a case that uplink data is generated. Furthermore, the demodulation reference signal and the multi-access signature resource may be associated with each other, and such information is used to generate an uplink physical channel (S104). The terminal apparatus 20 transmits the uplink physical channel and the demodulation reference signal (initial transmission) without obtaining the UL Grant from the base station apparatus 10 by using the DCI (S105). Beside the demodulation reference signal, an identification signal may be transmitted that is used to identify the terminal apparatus 20 to which the base station apparatus 10 has transmitted data.

The base station apparatus 10 performs identification processing on the terminal apparatus 20 by using the demodulation reference signal/identification signal allocated to each terminal apparatus 20. Furthermore, the base station apparatus 10 performs uplink physical channel detection processing on the identified terminal apparatus 20 by using the demodulation reference signal/identification signal, the multi-access signature resource, and the like. The base station apparatus 10 further performs error detection processing using the UE ID allocated to each terminal apparatus (S106). Based on the result of the error detection, the base station apparatus 10 transmits the ACK/NACK to the terminal apparatus 20 (S107). In S106, in a case that no errors are detected, the base station apparatus 10 determines to have correctly completed the identification of the terminal apparatus 20 and the reception of the uplink data transmitted by the terminal apparatus, and transmits the ACK. On the other hand, in a case that an error is detected in S106, the base station apparatus 10 determines to have incorrectly identified the terminal apparatus 20 or received the uplink data transmitted by the terminal apparatus, and transmits the NACK.

The terminal apparatus 20 having received the NACK again transmits (retransmits) the uplink physical channel and the reference signal (S108). In a case that the base station apparatus 10 indicates a multi-access signature resource and a physical resource for retransmission, the terminal apparatus 20 changes the multi-access signature resource and the physical resource in accordance with a predetermined pattern or the lookup table or the like specified in the control information. The base station apparatus 10 performs uplink physical channel detection processing on the retransmitted uplink physical channel (S109). The base station apparatus 10 further performs error detection processing using the UE ID allocated to each terminal apparatus (S109). Based on the result of the error detection, the base station apparatus 10 transmits the ACK/NACK to the terminal apparatus 20 (S110). The base station apparatus 10 notifies the terminal apparatus 20 of deactivation in a case of ending the allowance for the grant free access data transmission by using one of the RRC message, SIBs, and DCI (L1 signaling) (S111). Here, the deactivation may be transmitted only in a case that the terminal apparatus 20 need not perform the grant free access. In a case that the terminal apparatus 20 needs to perform the grant free access data transmission, the terminal apparatus 20 may maintain the activation state without performing the deactivation.

The grant free access may involve application of synchronous HARQ in which the time from the data transmission from the terminal apparatus 20 until the ACK/NACK transmission from the base station apparatus 10 is equal to a predetermined time, and asynchronous HARQ in which the base station apparatus 10 can change ACK/NACK transmission timings. In the mMTC transmission, data is transmitted for which a long latency is acceptable, and thus either the synchronous HARQ or the asynchronous HARQ may be used. On the other hand, in the URLLC transmission, data is transmitted that requires low latency and high reliability. Thus, in a case that the base station apparatus 10 has failed to correctly detect data, retransmission control with low latency is necessary. For example, a synchronous HARQ in which the ACK/NACK is transmitted in a fixed, short time, an asynchronous HARQ in which the base station apparatus 10 transmits the ACK/NACK within a short time, and the like are needed.

Figure 5:
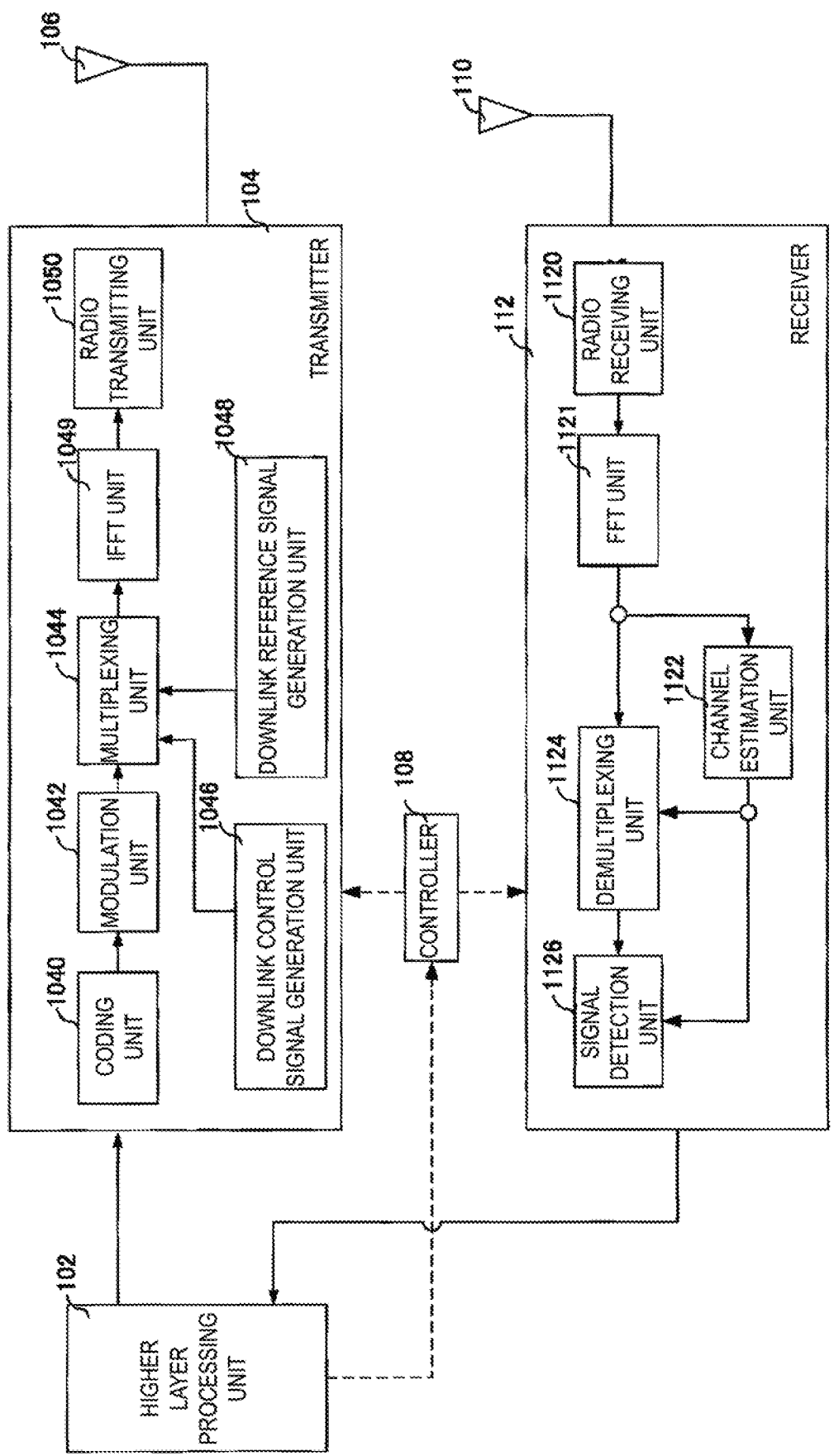
FIG. 5 is a schematic block diagram illustrating a configuration of a base station apparatus 10 according to the first embodiment.

FIG. 5 is a schematic block diagram illustrating a configuration of the base station apparatus 10 according to the present embodiment. The base station apparatus 10 includes a higher layer processing unit (higher layer processing step) 102, a transmitter (transmitting step) 104, a transmit antenna 106, a controller (control step) 108, a receive antenna 110, and a receiver (receiving step) 112. The transmitter 104 includes a coding unit (coding step) 1040, a modulation unit (modulating step) 1042, a multiplexing unit (multiplexing step) 1044, a downlink control signal generation unit (downlink control signal generating step) 1046, a downlink reference signal generation unit (downlink reference signal generating step) 1048, an IFFT unit 1049 (IFFT step), and a radio transmitting unit (radio transmitting step) 1050. The receiver 112 includes a radio receiving unit (radio receiving step) 1120, an FFT unit (FFT step) 1121, a channel estimation unit (channel estimating step) 1122, a demultiplexing unit (demultiplexing step) 1124, and a signal detection unit (signal detecting step) 1126.

The higher layer processing unit 102 performs processing of a higher layer, such as the Medium Access Control (MAC) layer, the Packet Data Convergence Protocol (PDCP) layer, the Radio Link Control (RLC) layer, and the Radio Resource Control (RRC) layer, that is higher than the physical layer. The higher layer processing unit 102 generates information needed to control the transmitter 104 and the receiver 112, and outputs the resultant information to the controller 108. The higher layer processing unit 102 outputs downlink data (e.g., the DL-SCH), broadcast information (e.g., the BCH), a Hybrid Automatic Request indicator (HARQ indicator), and the like to the transmitter 104.

The higher layer processing unit 102 receives information related to the terminal apparatus, such as the function of the terminal apparatus (UE capability) and the like, from the terminal apparatus 20 (via the receiver 112). The information related to the terminal apparatus includes information indicating that the grant free access is supported, information indicating whether the grant free access is supported on a function-by-function basis. The information indicating that the grant free access is supported and the information indicating whether the grant free access is supported on a function-by-function basis may be distinguished from each other based on the transmission mode. The higher layer processing unit 102 can determine whether the grant free access is supported, depending on the transmission mode supported by the terminal apparatus 20.

The higher layer processing unit 102 generates or acquires from a higher node, system information (MIB, SIB) to be broadcasted. The higher layer processing unit 102 outputs, to the transmitter 104, the system information to be broadcasted. The system information to be broadcasted can include information indicating that the base station apparatus 10 supports the grant free access. The higher layer processing unit 102 can include, in the system information, a portion or all of the configuration information related to the grant free access (such as the configuration information related to the multi-access resources such as the multi-access physical resource, the multi-access signature resource). The uplink system control information is mapped to the physical broadcast channel/physical downlink shared channel in the transmitter 104.

The higher layer processing unit 102 generates or acquires from a higher node, downlink data (transport blocks) to be mapped to the physical downlink shared channel, system information (SIB), an RRC message, a MAC CE, and the like, and outputs the downlink data and the like to the transmitter 104. The higher layer processing unit 102 can include, in higher layer signaling, some or all of the configuration information related to the grant free access and parameters indicating setup and/or release of the grant free access. Here, the setup of the grant free access may include the activation of the grant free access, or may otherwise notify the activation by using higher layer signaling or DCI. The release of the grant free access may include the deactivation of the grant free access, or may otherwise notify the deactivation by using the higher layer signal or DCI. The higher layer processing unit 102 may generate a dedicated SIB for notifying the configuration information related to the grant free access.

The higher layer processing unit 102 maps the multi-access resources to the terminal apparatuses 20 supporting the grant free access. The base station apparatus 10 may hold a lookup table of configuration parameters for the multi-access signature resource. The higher layer processing unit 102 allocates each configuration parameter to the terminal apparatuses 20. The higher layer processing unit 102 uses the multi-access signature resource to generate configuration information related to the grant free access for each terminal apparatus. The higher layer processing unit 102 generates a downlink shared channel including a portion or all of the configuration information related to the grant free access for each terminal apparatus. The higher layer processing unit 102 outputs, to the controller 108/transmitter 104, the configuration information related to the grant free access.

The higher layer processing unit 102 configures a UE ID for each terminal apparatus and notifies the terminal apparatus of the UE ID. As the UE ID, a Cell Radio Network Temporary Identifier (RNTI) can be used. The UE ID is used for the scrambling of the CRC added to the downlink control channel and the downlink shared channel. The UE ID is used for scrambling of the CRC added to the uplink shared channel. The UE ID is used to generate an uplink reference signal sequence. The higher layer processing unit 102 may configure a grant free access-specific UE ID. The higher layer processing unit 102 may configure the UE ID separately depending on whether or not the terminal apparatus supports the grant free access. For example, in a case that the downlink physical channel is transmitted in the scheduled access and the uplink physical channel is transmitted in the grant free access, the UE ID for the downlink physical channel may be configured separately from the UE ID for the downlink physical channel. The higher layer processing unit 102 outputs the configuration information related to the UE ID to the transmitter 104/controller 108/receiver 112.

The higher layer processing unit 102 determines the coding rate, the modulation scheme (or MCS), and the transmit power for the physical channels (physical downlink shared channel, physical uplink shared channel, and the like). The higher layer processing unit 102 outputs the coding rate/modulation scheme/transmit power to the transmitter 104/controller 108/receiver 112. The higher layer processing unit 102 can include the coding rate/modulation scheme/transmit power in higher layer signaling.

Based on the various types of configuration information input from the higher layer processing unit 102, the controller 108 controls the transmitter 104 and the receiver 112. The controller 108 generates the downlink control information (DCI), based on the configuration information related to downlink transmission and uplink transmission input from the higher layer processing unit 102, and outputs the generated information to the transmitter 104. The controller 108 may include some or all of the configuration information related to the grant free access in the downlink control information.

The controller 108 controls the receiver 112 in accordance with the configuration information related to the grant free access and input from the higher layer processing unit 102. The controller 108 identifies channel estimation and a terminal apparatus for the channel estimation unit 1122 in accordance with the multi-access signature resource and the demodulation reference signal sequence/identification signal input from the higher layer processing unit 102. The controller 108 outputs, to the signal detection unit 1126, the identification result for the terminal apparatus having transmitted the data, the channel estimation value, the multi-access signature resource used by the identified terminal apparatus, and the like. Note that the function of the controller 108 can be included in the higher layer processing unit 102.

The transmitter 104 codes and modulates the broadcast information, the downlink control information, the downlink shared channel, and the like input from the higher layer processing unit 102 for each terminal apparatus, to generate a physical broadcast channel, a physical downlink control channel, and a physical downlink shared channel. The coding unit 1040 codes the broadcast information, the downlink control information, and the downlink shared channel by using the predetermined coding scheme/coding scheme determined by the higher layer processing unit 102 (the coding includes repetitions). The coding scheme may involve application of convolutional coding, turbo coding, Low Density Parity Check (LDPC) coding, Polar coding, and the like. The modulation unit 1042 modulates the coded bits input from the coding unit 1040, in compliance with the predetermined modulation scheme/modulation scheme determined by the higher layer processing unit 102, such as BPSK, QPSK, 16QAM, 64QAM, or 256QAM.

The downlink control signal generation unit 1046 adds the CRC to the downlink control information input from the controller 108, to generate a physical downlink control channel. The downlink control information includes a portion or all of the configuration information related to the grant free access. The CRC is scrambled with the UE ID allocated to each terminal apparatus. The downlink reference signal generation unit 1048 generates a downlink reference signal. The downlink reference signal is determined in accordance with a predetermined rule based on, e.g., the UE ID for identifying the base station apparatus 10.

The multiplexing unit 1044 maps the modulation symbols of each modulated downlink physical channel, the physical downlink control channel, and the downlink reference signal to the resource elements. The multiplexing unit 1044 maps the physical downlink shared channel and the physical downlink control channel to resources allocated to each terminal apparatus.

The IFFT unit 1049 performs Inverse Fast Fourier Transform (IFFT) on the modulation symbols of each multiplexed downlink physical channel to generate OFDM symbols. The radio transmitting unit 1050 adds cyclic prefixes (CPs) to the OFDM symbols to generate a baseband digital signal. Furthermore, the radio transmitting unit 1050 converts the digital signal into an analog signal, removes excess frequency components from the analog signal by filtering, performs up-conversion to the carrier frequency, performs power amplification, and outputs the resultant signal to the transmit antenna 106 for transmission.

The receiver 112 uses the demodulation reference signal/identification signal to detect the uplink physical channel transmitted from the terminal apparatus 20 by the grant free access. The receiver 112 identifies the terminal apparatus for each terminal apparatus and detects the uplink physical channel, based on the configuration information related to the grant free access configured for each terminal apparatus.

The radio receiving unit 1120 converts, by down-conversion, an uplink signal received through the receive antenna 110 into a baseband signal, removes unnecessary frequency components from the baseband signal, controls the amplification level in such a manner as to suitably maintain a signal level, performs orthogonal demodulation based on an in-phase component and an orthogonal component of the received signal, and converts the resulting orthogonally-demodulated analog signal into a digital signal. The radio receiving unit 1120 removes a portion of the digital signal resulting from the conversion, the portions corresponding to the CPs. The FFT unit 1121 performs Fast Fourier Transform (FFT) on the signal from which the CPs have been removed, and extracts a signal in the frequency domain.

The channel estimation unit 1122 uses the demodulation reference signal/identification signal to perform identification of the terminal apparatus and channel estimation for signal detection for the uplink physical channel. The channel estimation unit 1122 receives as inputs, from the controller 108, the resources to which the demodulation reference signal/identification signal are mapped and the demodulation reference signal sequence/identification signal allocated to each terminal apparatus. The channel estimation unit 1122 uses the demodulation reference signal sequence/identification signal to measure the channel state between the base station apparatus 10 and the terminal apparatus 20. The channel estimation unit 1122 can identify the terminal apparatus by using the result of channel estimation (impulse response and frequency response with the channel state) (the channel estimation unit 1122 is thus also referred to as an identification unit). The channel estimation unit 1122 determines that an uplink physical channel has been transmitted by the terminal apparatus 20 associated with the demodulation reference signal/identification signal from which the channel state has been successfully extracted. In a case of an SRS reception timing, the channel estimation unit 1122 extracts the SRS, based on information about SRS transmission parameters notified to the terminal apparatus, to recognize the channel state and also recognize a necessity for determination of whether closed-loop transmission power control and timing alignment are necessary. In the resource on which the uplink physical channel is determined by the channel estimation unit 1122 to have been transmitted, the demultiplexing unit 1124 extracts the signal in the frequency domain input from the radio receiving unit 1120 (the signal includes signals from multiple terminal apparatuses 20).

The signal detection unit 1126 uses the channel estimation result and the signal in the frequency domain input from the demultiplexing unit 1124 to detect a signal of uplink data (uplink physical channel) from each terminal apparatus. The signal detection unit 1126 performs detection processing for a signal from the terminal apparatus 20 associated with the demodulation reference signal (demodulation reference signal from which the channel state has been successfully extracted)/identification signal allocated to the terminal apparatus 20 determined to have transmitted the uplink data.

The higher layer processing unit 102 acquires, from the signal detection unit 1126, decoded uplink data (bit sequence resulting from hard decision) for each terminal apparatus. The higher layer processing unit 102 performs descrambling (exclusive-OR operation) on the CRC included in the decoded uplink data for each terminal apparatus, by using the UE ID allocated to the terminal. In a case that no error is found in the uplink data as a result of the descrambling error detection, the higher layer processing unit 102 correctly completes the identification of the terminal apparatus and determines that the uplink data transmitted from the terminal apparatus has been correctly received.

Figure 6:
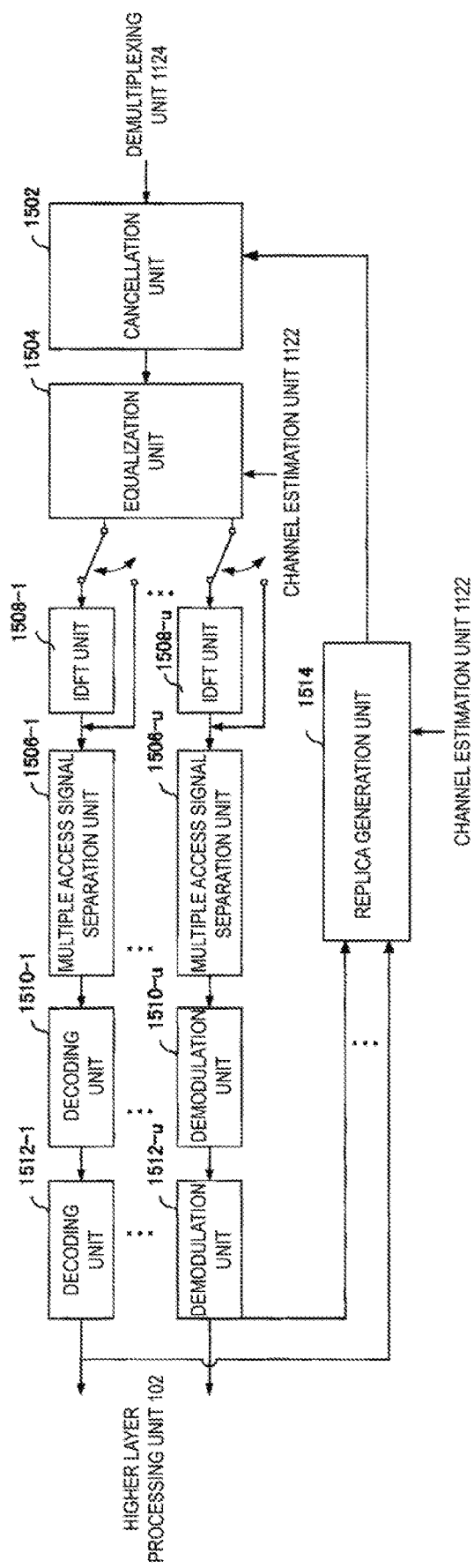
FIG. 6 is a diagram illustrating an example of a signal detection unit according to the first embodiment.

FIG. 6 is a diagram illustrating an example of the signal detection unit according to the present embodiment. The signal detection unit 1126 includes a cancellation unit 1502, an equalization unit 1504, multiple access signal separation units 1506-1 to 1506-*u*, IDFT units 1508-1 to 1508-*u*, demodulation units 1510-1 to 1510-*u*, decoding units 1512-1 to 1512-*u*, and a replica generation unit 1514. u is the number of terminal apparatuses determined by the channel estimation unit 1122 to have transmitted uplink data (for which the channel state has been successfully extracted) on the same multi-access physical resource or overlapping multi-access physical resources (at the same time and at the same frequency). Each of the portions constituting the signal detection unit 1126 is controlled using the configuration related to the grant free access for each terminal apparatus and input from the controller 108.

The cancellation processing unit 1502 subtracts a soft replica input from the replica generation unit 1514 from the signal in the frequency domain input from the demultiplexing unit 1124 (the signal includes the signals from the terminal apparatuses) (cancellation processing). The equalization unit 1504 generates an equalization weight based on the MMSE standard, from the frequency response input from the channel estimation unit 1122. Here, MRC and ZF may be used for the equalization processing. The equalization unit 1504 multiplies the equalization weight by the signal in the frequency domain resulting from soft cancellation, and extracts the signal in the frequency domain from each terminal apparatus. The equalization unit 1504 outputs the equalized signal in the frequency domain from each terminal apparatus to the IDFT units 1508-1 to 1508-*u*. Here, in a case that data is to be detected that is transmitted by the terminal apparatus 20 and that uses the DFTS-OFDM signal waveform, the signal in the frequency domain is output to the IDFT units 1508-1 to 1508-*u*. In a case that data is to be received that is transmitted by the terminal apparatus 20 and that uses the CP-OFDM signal waveform, the signal in the frequency domain is output to the multiple access signal separation units 1506-1 to 1506-*u*. The signal waveform used for the data transmission may differ for each terminal apparatus.

The IDFT units 1508-1 to 1508-*u* converts the equalized signal in the frequency domain from each terminal apparatus into a signal in the time domain. Note that the IDFT units 1508-1 to 1508-*u* correspond to processing performed by the DFT unit 2104 of the terminal apparatus 20. The multiple access signal separation units 1506-1 to 1506-*u* separates the signal multiplexed by the multi-access signature resource from the signal in the time domain from each terminal apparatus after conversion with the IDFT (multiple access signal separation processing). For example, in a case that code spreading is used as a multi-access signature resource, each of the multiple access signal separation units 1506-1 to 1506-*u* performs inverse spreading processing using the spreading code sequence assigned to each terminal apparatus. Note that, in a case that interleaving is applied as a multi-access signature resource, de-interleaving is performed on the signal in the time domain from each terminal apparatus after conversion with the IDFT (deinterleaving unit).

The demodulation units 1510-1 to 1510-*u* receive as an input, from the controller 108, pre-notified or predetermined information about the modulation scheme of each terminal apparatus. Based on the information about the modulation scheme, the demodulation units 1510-1 to 1510-*u* perform demodulation processing on the separated multiple access signal, and outputs a Log Likelihood Ratio (LLR) of the bit sequence.

The decoding units 1512-1 to 1512-*u* receives as an input, from the controller 108, pre-notified or predetermined information about the coding rate. The decoding units 1512-1 to 1512-*u* perform decoding processing on the LLR sequences output from the demodulation units 1510-1 to 1510-*u*. In order to perform cancellation processing such as a Successive Interference Canceller (SIC) or turbo equalization, the decoding units 1512-1 to 1512-*u* output, to the replica generation unit 1514, external LLRs or post LLRs output from the decoding units. A difference between the external LLR and the post LLR is whether to subtract, from the decoded LLR, the pre LLR input to each of the decoding units 1512-1 to 1512-*u*. In a case that the number of repetitions of SIC or turbo equalization is larger than or equal to a prescribed value, the decoding units 1512-1 to 1512-*u* perform hard decision on the LLR resulting from the decoding processing, and outputs the bit sequence of the uplink data for each terminal apparatus to the higher layer processing unit 102.

The replica generation unit 1514 generate a symbol replica for each terminal apparatus in accordance with the modulation scheme in which the LLR sequence input from each decoding unit is applied to the uplink data by the terminal apparatus. The replica generation unit 1514 performs signal conversion on the symbol replica according to the multi-access signature resource applied to the uplink data by each terminal apparatus. Furthermore, the replica generation unit 1514 converts, by the DFT, the signal resulting from the multiple access processing to a signal in the frequency domain. Then, the replica generation unit 1514 multiplies the signal resulting from the DFT by the frequency response input from the channel estimation unit 1122, to generate a soft replica. Note that, in FIG. 6, the signal detection using the turbo equalization processing has been described but can be replaced with signal detection based on replica generation and using no interference cancellation, maximum likelihood detection, EMMSE-IRC, or the like.

Figure 7:
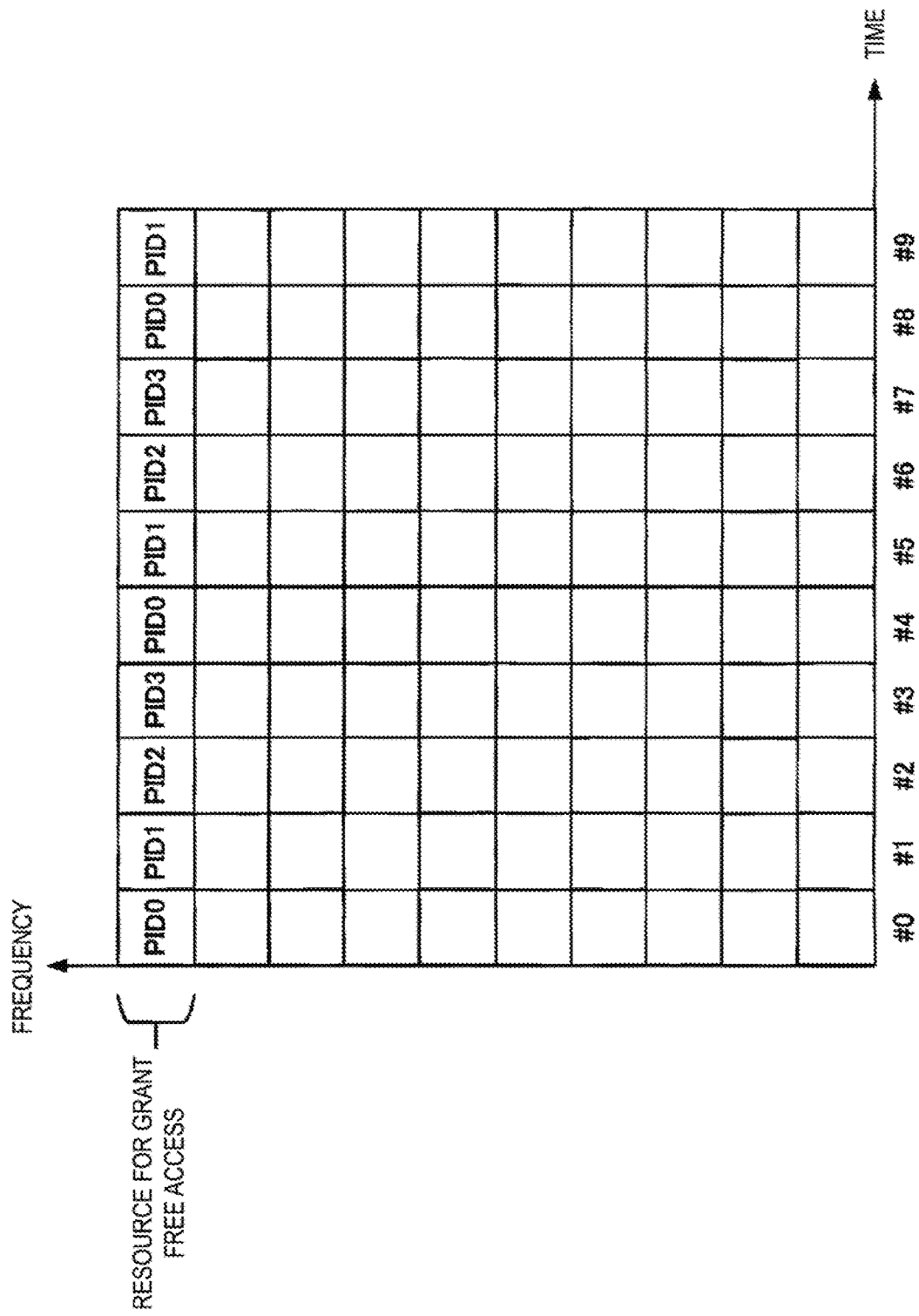
FIG. 7 is a diagram illustrating an example of association of radio resources with process IDs according to the present embodiment.

FIG. 7 illustrates an example of an association of radio resources with process IDs according to the present embodiment. Here, the process ID is an HARQ process ID and is hereinafter referred to as the process ID. In FIG. 7, divisions of frequencies are assumed to correspond to resource blocks or resource block groups each including multiple resource blocks. Each of the resource blocks includes multiple subcarriers, and may be constituted with, for example, 12 subcarriers or 24 subcarriers. Divisions in a time direction in FIG. 7 are assumed to correspond to frames (radio frames), subframes, or slots, or the number of OFDM symbols corresponding to the minimum unit for scheduling (the number is smaller than the number of OFDM symbols constituting the slot). For the slot, for example, seven OFDM symbols may constitute one slot. For the subframe, for example, two slots may constitute one subframe. For the frame (radio frame), for example, 10 subframes may constitute one frame. An example will be described below in which the divisions in the frequency direction are assumed to correspond to resource block groups, whereas the divisions in the time direction are assumed to correspond to slots. The example in FIG. 7 corresponds to a case in which the number of process IDs for the grant free access is four and in which a grant free access resource is not frequency-hopped. In other words, in this case, the resource block group for the grant free access resource does not vary depending on the frame, the subframe, the slot, or the OFDM symbol. In this example, the grant free access is enabled in all slots. In FIG. 7, in a case that the number of process IDs is denoted as Pn and the slot number (slot index) is denoted as Sn, the process number is defined as the remainder of division of Sn by Pn (X mod (Y) is defined as the remainder of division of X by Y and hereinafter represented as Sn (mod Pn). Thus, in a case that grant free access data transmission is performed in slot 5, the process ID is 1. Here, in a case that grant free access data transmission is repeated multiple times, the data may be transmitted within the same slot or transmitted repeatedly over multiple slots. In a case that the data is repeatedly transmitted over multiple slots, the data transmission is enabled only in the slots with the same process ID.

Figure 8:
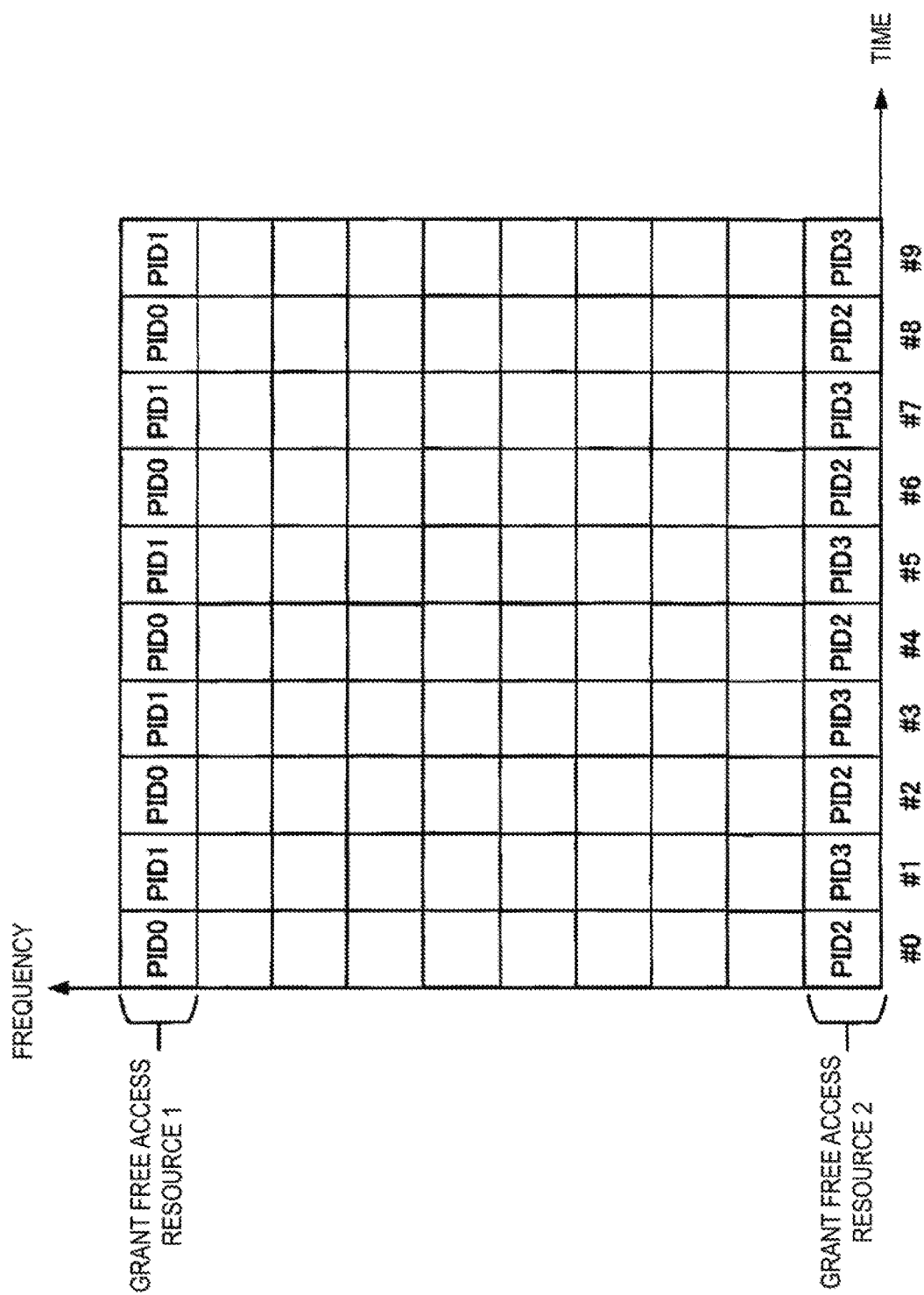
FIG. 8 is a diagram illustrating an example of association of radio resources with process IDs according to the present embodiment.

FIG. 8 illustrates an example of an association of radio resources with process IDs according to the present embodiment. In the example in FIG. 8, resource block groups for multiple grant free accesses are configured and allocated at both ends of usable resource block groups (both ends of resource block groups that can be used for one serving cell or one component carrier). However, one aspect of the present invention is not limited to this example. For example, the multiple grant free access resources may be adjacent resource block groups. In a case that the resource block groups at both ends or non-contiguous resource block groups are grant free access resources as in the example in FIG. 8, there is a reduced possibility that channel gains of multiple grant free access resources decrease due to frequency selective fading. On the other hand, in a case that the multiple grant free access resources are adjacent resource block groups (e.g., the number of grant free access resources is two, and the multiple grant free access resources are grant free access resource 1 in FIG. 8 and a resource block group adjacent to this resource is referred to as grant free access resource 2), the number of guard bands required is advantageously reduced in a case that signals with different subcarrier spacings (numerologies), different frame structures, or the like are frequency-division multiplexed. FIG. 8 illustrates an example in which the grant free access resource can be used in all slots. However, limitation to this example of the present invention is not intended, and for example, the grant free access resource may be configured with a period of two slots or four slots.

In the example in FIG. 8, process IDs PID0 and PID1 are allocated to grant free access resource 1, and process IDs PID2 and PID3 are allocated to grant free access resource 2. That is, for grant free access resource 1, the process number is calculated by Sn (mod (Pn/Rn)), and Rn is the number of grant free access resources. On the other hand, for grant free access resource 2, the process number is calculated by Sn (mod (Pn/Rn))+(Pn/Rn).

Figure 9:
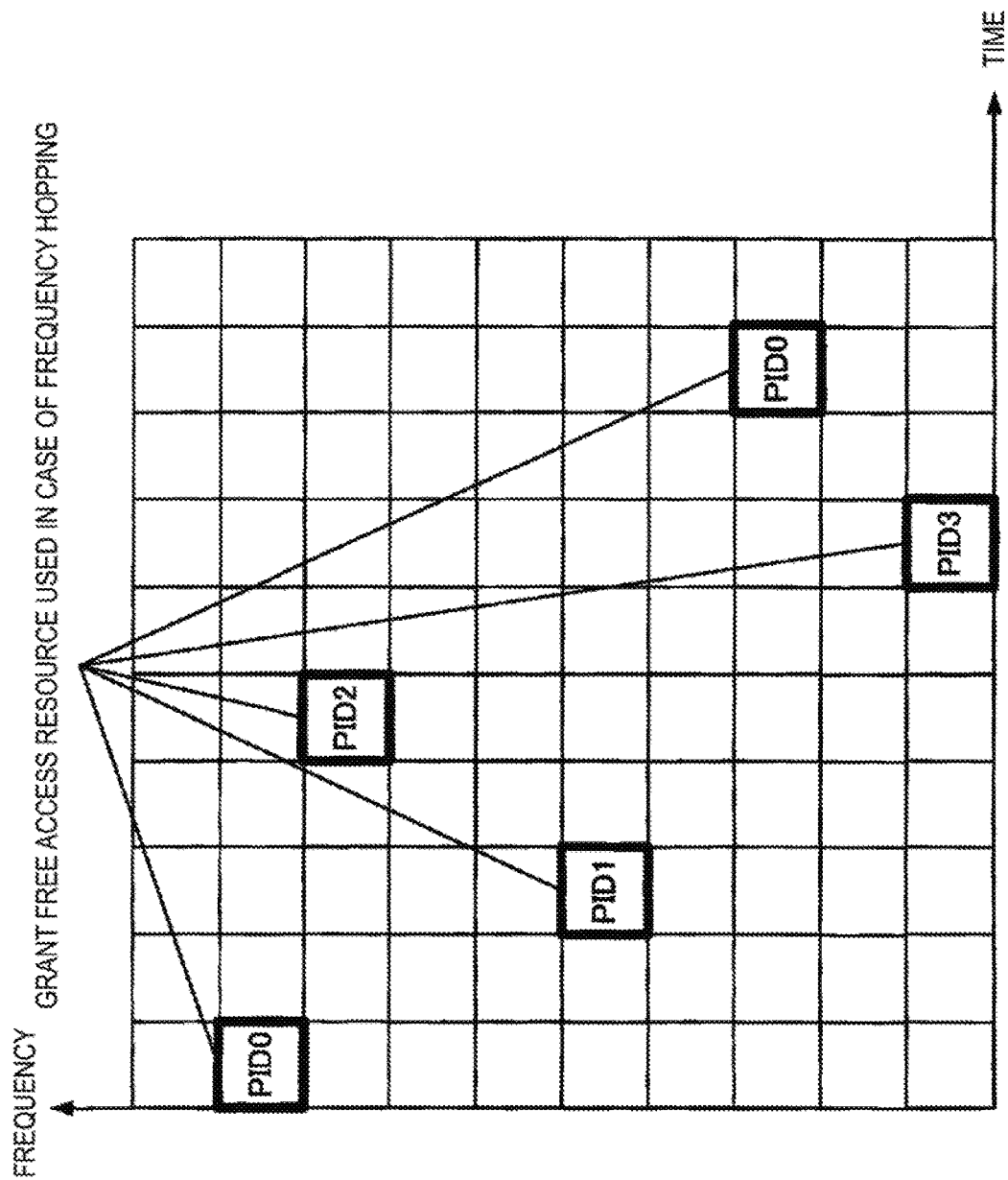
FIG. 9 is a diagram illustrating an example of association of radio resources with process IDs according to the present embodiment.

FIG. 9 illustrates an example of an association of radio resources with process IDs according to the present embodiment. FIG. 9 illustrates a case in which the grant free access resources are frequency-hopped, and in this example, resources are configured that enable the grant free access once in two slots. In this case, the process number is calculated by Sn/Sp (mod Pn), and Sp is the period with which the grant free access is configured. For example, Sp=2 indicates that resources are configured that enable the grant free access once in two slots, as is the case with FIG. 9. According to one aspect of the present invention, the method for associating radio resources with process IDs is not limited to the examples in FIG. 7 to FIG. 9, and for example, the process number may be determined from the slot number and a UE unique parameter P_ue and a cell-specific parameter P_cell notified in the RRC. Specifically, the process number may be calculated by PID_gf=Sn+P_ue+P_cell (mod Pn). P_ue may be the C-RNTI or the RNTI for the grant free access. Pn may be the number of process IDs that can be used for the grant free access data transmission. Pn may be predetermined or notified so as to be configurable for each UE through an RRC. The process ID associated with the radio resource for the grant free access in FIG. 7 to FIG. 9 may be precluded from being used as a process ID of initial data transmission for the scheduled access. In this case, in a case that PID_gf has a value equal to or greater than G, the process number for the grant free access data transmission process may be obtained by PID'_gf=PID_gf+G. G may be predetermined or notified in the RRC so as to be configurable for each UE.

Figure 10:
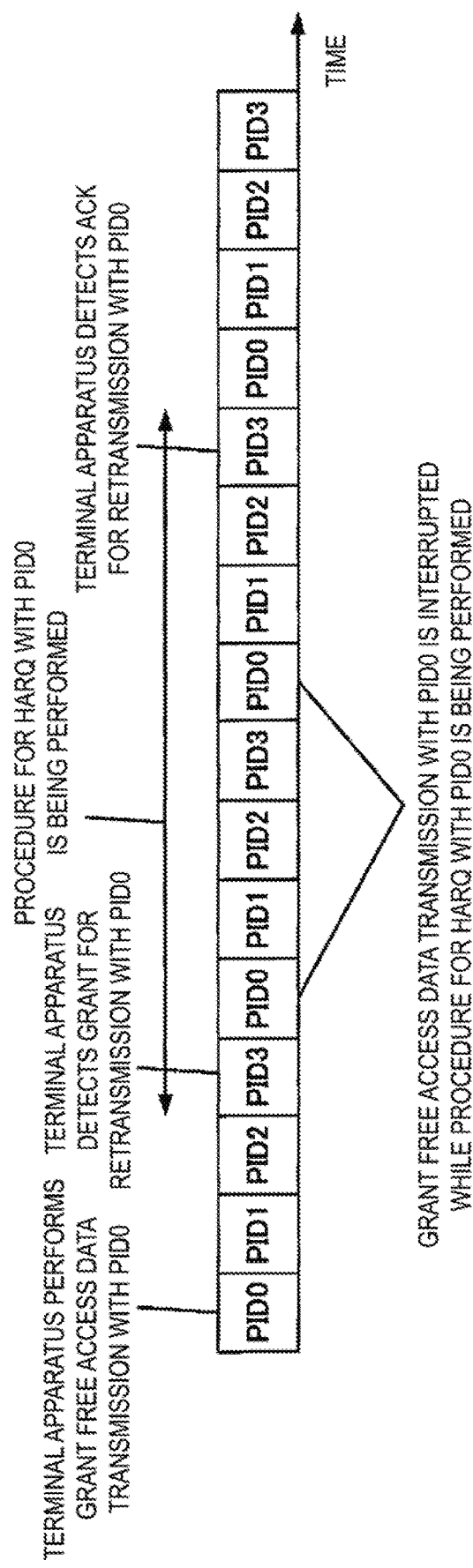
FIG. 10 is a diagram illustrating an example of a process management method according to the present embodiment.

FIG. 10 illustrates an example of a process management method according to the present embodiment. For simplification of description, FIG. 10 illustrates a case with one grant free access resource and four processes. However, one aspect of the invention is not limited to this example. The grant free access resource may be configured as contiguous slots or periodically configured as non-contiguous slots. Frequency hopping may or may not be applied to the grant free access resource. In FIG. 10, the terminal apparatus performs grant free access data transmission in slot n with PID0. The terminal apparatus detects, in slot n+n_grant, a grant for retransmission for the grant free access with PID0. However, in a case of the synchronous HARQ, n_grant is a terminal apparatus specific or cell-specific slot count. In a case of the asynchronous HARQ, n-grant is not a value shared between the base station apparatus and the terminal apparatus and can be determined by the base station apparatus. FIG. 10 illustrates an example in which n_grant=3.

After detecting the grant for retransmission for the grant free access with PID0, the terminal apparatus determines that PID0 has switched to schedule-based retransmission. In this case, in a case that the terminal apparatus performs, during the schedule-based retransmission with PID0, the grant free access with PID0 and a retransmission occurs, the second PID0 of a schedule-based process causes another retransmission control with the same process ID. Thus, in the present embodiment, the terminal apparatus interrupts the data transmission in the grant free access resource with PID0 during the schedule-based retransmission with PID0. That is, for the grant free access data transmission with PIDx (x=0 in the example in FIG. 10), the terminal apparatus does not perform the grant free access data transmission in the resource with PIDx from slot n+n_grant in which the grant for the retransmission with PIDx is detected until slot n+n_grant+n_ack in which an ACK for the retransmission with PIDx is received, and performs the grant free access data transmission in a resource with PIDy (y≠x). FIG. 10 illustrates an example with n_ack=8. However, n_ack depends on the configuration of the number of retransmissions and a control delay for schedule-based data transmission (a time from grant reception to data transmission or a time from data transmission to ACK/NACK reception).

During the schedule-based retransmissions of the PIDx, a period in which the grant free access with PIDx is not available may be from slot n+n_grant+m1 to slot n+n_grant+n_ack+m2. This is because the terminal apparatus is unable to stop data transmission in the slot in which the grant is detected, and a time for m1 (integer of 0 or larger) slots is provided in consideration of a processing delay for the terminal apparatus to detect the grant by blind decoding. For m2 (integer of 0 or larger), a time for m2 slots is provided in consideration of the time needed for the terminal apparatus to perform reception processing for an ACK/NACK notified on the PDCCH. m1 and m2 may be predetermined values or notified to the terminal apparatus from the base station apparatus by using a higher layer control signal such as the RRC.

In the retransmission control, the maximum value of the number of retransmissions is notified by using the higher layer control signal such as the RRC, and the terminal apparatus repeats retransmissions up to the maximum number of the number of retransmissions. In a case of receiving a NACK, the terminal apparatus receives no ACK. Here, operations will be described that are performed in a case that, during the schedule-based retransmission with PIDx, NACKs have been received, the number of which corresponds to the maximum value of the number of retransmissions. In this case, since ACK fails to be received, the grant free access data transmission is disadvantageously precluded from being resumed in the resource with PIDx. Thus, during the schedule-based retransmission with PIDx, in a case of receiving the NACKs, the number of which corresponds to the maximum value of the number of retransmissions, the terminal apparatus may consider that the HARQ procedure with PIDx has ended and resume the grant free access data transmission in the resource with the PIDx. The slot in which the NACKs are received, the number of which corresponds to the maximum value of the number of retransmissions, may be slot n+n_grant+n_nack_max, and the grant free access data transmission in the resource with PIDx may be resumed in slot n+n_grant+n_nack_max+m2.

In a case of detecting no ACK in the schedule-based retransmission with PIDx (in a case that the terminal apparatus fails to decode the PDCCH), the terminal apparatus is precluded from resuming the grant free access data transmission in the resource with PIDx. Here, a timeout time may be configured when the schedule-based data transmission with PIDx is interrupted. Specifically, the terminal apparatus may be notified of n_timeout by the base station apparatus by using the higher layer control signal such as the RRC, and a period of time during which the grant free access with PIDx is unusable may be from slot slot n+n_grant+m1 to slot min(n+n_grant+n_ack+m2, n+n_grant+m1+n_timeout). min(X, Y) is a function to select a smaller value of X and Y. Thus, the grant free access data transmission in the resource with PIDx can be resumed n_timeout slots after the slot in which the grant free access data transmission in the resource with PIDx is disabled, regardless of whether the ACK is present.

The present embodiment corresponds to an example in which the process number associated with the radio resource for the grant free access is precluded from being used as a process number for initial schedule-based transmission. Thus, eight uplink process numbers may be available, with 0 to 3 used for the grant free access and 4 to 7 used for the schedule-based access. Different RNTIs may be used to decode the grant for the retransmission for the grant free access data transmission and to decode the grant for the retransmission for the schedule-based access data transmission. Eight uplink process numbers may be available and may be used for each of the grant free access and the schedule-based access. In other words, process management may be performed, based on the type of the detected RNTI and information about the process ID included in the DCI.

In the present embodiment, transmission opportunities for the grant free access have been described in terms of slots, but the slot may be replaced with an OFDM symbol unit, multiple OFDM symbol units, or a subframe unit.

In the present embodiment, the process ID is determined, based on the association of the grant free access data transmission with the radio resource. In a case that the retransmission is switched to the schedule-based data transmission, during the retransmission procedure, the data transmission in the radio resource associated with the process ID of the retransmission is interrupted. Thus, parallel use of transmissions with the same process ID can be avoided. As a result, in the grant free access, process management can be appropriately achieved and synthesis of retransmission signals and the like can be implemented, enabling low latency due to a reduced number of retransmissions, improvement of error rate characteristics during the retransmission, and improvement of frequency efficiency.

Second Embodiment

The present embodiment corresponds to an example of a case in which the process ID is determined, based on the association of the grant free access data transmission with the radio resource and in which the terminal apparatus detects the grant for the retransmission with the process ID for which the grant free access data transmission has not been performed. A communication system according to the present embodiment includes the terminal apparatus 20 and the base station apparatus 10 described with reference to FIG. 3, FIG. 5, and FIG. 6. Differences from/additions to the first embodiment will be mainly described below.

Figure 11:
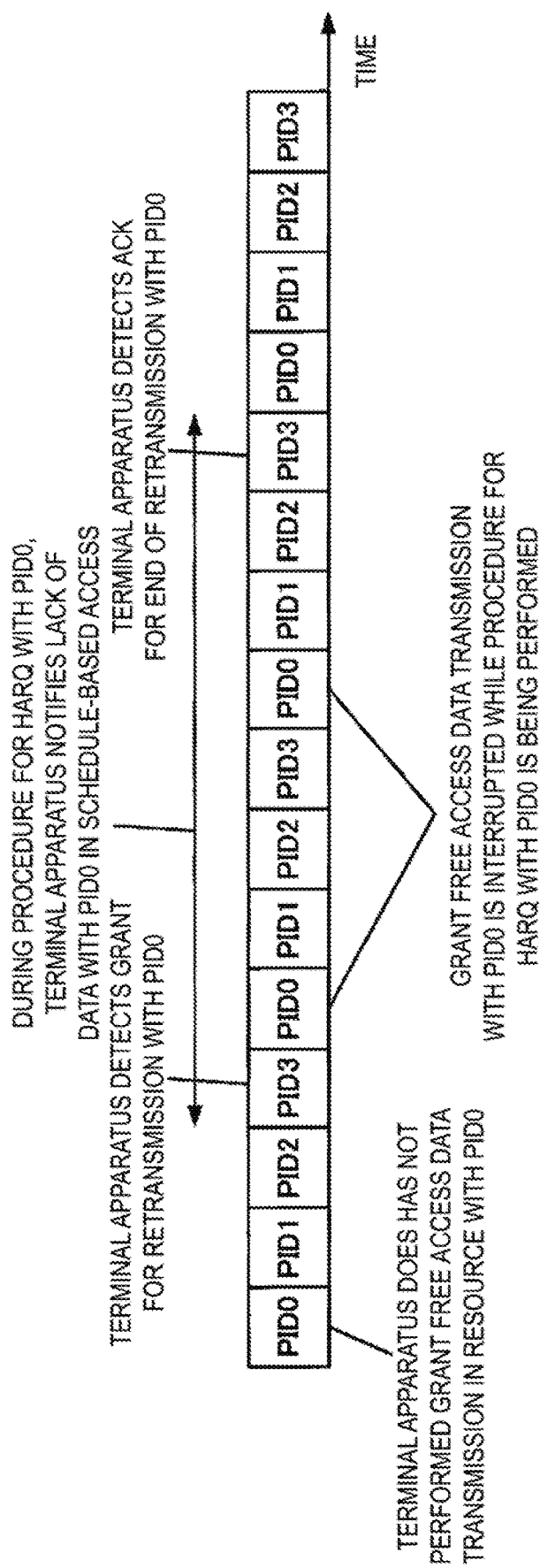
FIG. 11 is a diagram illustrating an example of a process management method according to a second embodiment.

FIG. 11 illustrates an example of a process management method according to the second embodiment. The difference between FIG. 11 and FIG. 10 is whether the terminal apparatus performs the grant free access data transmission in the leading slot with PID0 in the drawings. In FIG. 11, the terminal apparatus does not perform the grant free access data transmission in the leading slot with PID0 in the drawing. The terminal apparatus detects, in slot n+n_grant, the grant for the retransmission for the grant free access with PID0. Here, as in the preceding embodiment, the terminal apparatus interrupts, in slot n+n_grant+m1, the grant free access data transmission in the resource with PID0. Here, the terminal apparatus can ignore the grant for the retransmission corresponding to the grant free access with PID0. However, in this case, the base station apparatus transmits the NACK up to the maximum number of retransmissions, leading to an extended period of time during which the grant free access data transmission in the resource with PID0 is interrupted.

In the present embodiment, the terminal apparatus uses the radio resource included in the grant to notify the absence of the grant free access data transmission in the resource with PIDx. Specifically, a predetermined bit sequence or control information is transmitted between the base station apparatus and the terminal apparatus. In one example, by transmitting data applied with zero padding, the terminal apparatus notifies that the grant free access data transmission in the resource with PIDx has not been performed. Here, "zero padding" refers to, for example, transmission of a bit sequence including zeros the number of which corresponds to the number of bits of the transport block size notified in the retransmission grant. However, the present embodiment is not limited to this example, and the absence of the grant free access data transmission in the resource with PIDx may be notified along with a higher layer header such as a MAC header. In a case of detecting data applied with zero padding, the base station apparatus transmits the ACK in order to end the retransmission for the grant free access with PIDx. By receiving the ACK, the terminal apparatus determines that the retransmission with PIDx has ended and resumes the grant free access data transmission with the resource with PIDx.

In a case of detecting that the grant free access data transmission in the resource with PIDx has not been performed and detecting the grant for the retransmission for the grant free access with PIDx, the terminal apparatus may provide a Buffer Status Report (BSR) by using the radio resource included in the grant. In this case, for the BSR provided by the terminal apparatus, in a case that two types of BSRs for the grant free access and for the schedule-based access are available, the BSR for the grant free access may be transmitted or both BSRs may be transmitted. In a case that the number of bits with which the BSR is transmitted smaller than the number of bits for the transport block size specified in the grant, the zero padding is performed.

In a case that no grant free access data transmission in the resource with PIDx is performed and the grant for the retransmission for the grant free access with PIDx is detected, the terminal apparatus may use the radio resource included in the grant to transmit a Power Headroom (PH) and CSI in addition to the BSR. For example, depending on the number of data bits that can be transmitted by using the radio resource included in the grant, the BSR, PH, and CSI may be multiplexed in this order corresponding to the order of decreasing priority. For example, in a case that not all of the BSR, PH, and CSI can be transmitted by using the radio resource included in the grant, only the BSR and PH are transmitted, or only the BSR is transmitted.

In a case that no grant free access data transmission in the resource with PIDx is performed, the grant for the retransmission for the grant free access with PIDx is detected, and initial data is present, the terminal apparatus may perform initial data transmission by using the resource notified in the grant with PIDx. Here, in a case that any data other than the initial transmission data remains in the buffer, the data may be transmitted by using the resource notified in the grant with PIDx resource.

In a case that no grant free access data transmission in the resource with PIDx is not performed, the grant for the retransmission for the grant free access with PIDx is detected, and a grant with different PIDy (y≠x) is detected, the terminal apparatus may use the resource notified in the grant with PIDx to transmit data applied with zero padding and omit data transmission in the resource notified in the grant with PIDy. In the above-described case, the data transmission in the resource notified in the grant with PIDy may be performed, and the data transmission in the resource notified in the grant with PIDx may be omitted. An example in which only the grant transmission with PIDy is performed corresponds to a case in which one of the BSR, PH, or CSI is transmitted, a case in which the initial transmission data is held, or the like.

The present embodiment corresponds to an example in which the process number associated with the radio resource for the grant free access is precluded from being used as a process number for initial schedule-based transmission. Thus, eight uplink process numbers may be available, with 0 to 3 used for the grant free access and 4 to 7 used for the schedule-based access. Different RNTIs may be used to decode the grant for the retransmission for the grant free access data transmission and to decode the grant for the retransmission for the schedule-based access data transmission. Eight uplink process numbers may be available and may be used for each of the grant free access and the schedule-based access. In other words, process management may be performed, based on the type of the detected RNTI and information about the process ID included in the DCI.

In the present embodiment, transmission opportunities for the grant free access have been described in terms of slots, but the slot may be replaced with an OFDM symbol unit, multiple OFDM symbol units, or a subframe unit.

In the present embodiment, in a case that no grant free access data transmission in the resource with PIDx is not performed and the grant for the retransmission for the grant free access with PIDx is detected, the terminal apparatus notifies that the grant free access data transmission in the resource with PIDx has not been performed. Thus, the base station apparatus can end the retransmission control early that results from erroneous determination (False Alarm) involving detection of data from the terminal apparatus not having preformed data transmission. As a result, a reduction in usable resources for the grant free access can be prevented, low latency can be achieved, the radio resources can be efficiently used, enabling improvement of the frequency efficiency.

Third Embodiment

The present embodiment corresponds to an example in which, in a case that the retransmission for the grant free access data transmission is performed as the schedule-based data transmission, the process ID used for the retransmission can be used in parallel for the grant free access data transmission. A communication system according to the present embodiment includes the terminal apparatus 20 and the base station apparatus 10 described with reference to FIG. 3, FIG. 5, and FIG. 6. Differences from/additions to the first embodiment will be mainly described below.

Figure 12:
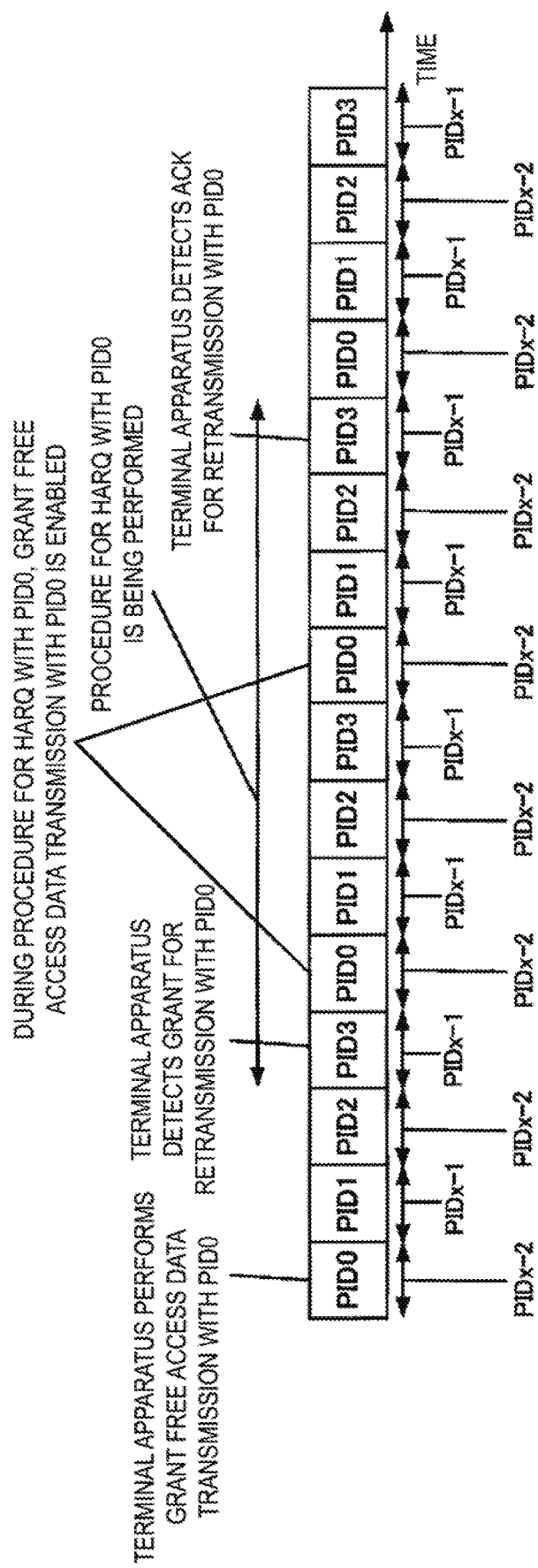
FIG. 12 is a diagram illustrating an example of a process management method according to a third embodiment.

FIG. 12 illustrates an example of a process management method according to the third embodiment. For simplification of description, FIG. 12 illustrates a case with one grant free access resource and four processes. However, one aspect of the invention is not limited to this example. The grant free access resource may be configured as contiguous slots or periodically configured as non-contiguous slots. Frequency hopping may or may not be applied to the grant free access resource. In FIG. 12, the terminal apparatus performs grant free access data transmission in slot n with PID0. The terminal apparatus detects, in slot n+n_grant, the grant for the retransmission for the grant free access with PID0.

In the first embodiment, the grant free access data transmission in the resource with PIDx is interrupted from slot n+n_grant+m1 until slot n+n_grant+n_ack+m2 (in the example in FIG. 12, x=0). However, in the present embodiment, even during the above-described period of time, the grant free access data transmission in the resource with PIDx is enabled. This is because the process number for the grant free access data transmission is associated with the radio resource and because the process number is extended at the time of switching to the schedule-based data transmission as the retransmission for the grant free access data transmission. As an example in which the process number is extended, a transmission timing (slot) for the grant for retransmission is used in FIG. 12.

In FIG. 12, PIDx-1 or PIDx-2 are meant to correspond to grant transmission timings in slot units, and the terminal apparatus detects the grant for the retransmission with PID0 at a timing PIDx-1, and thus the process ID of the schedule-based data transmission for the retransmission is PID0-1. In this way, for the same process ID in the grant free access data transmission, a different process ID can be provided in the schedule-based data transmission for the retransmission. Thus, even during execution of the procedure for the retransmission corresponding to the grant free access data transmission in the resource with PIDx, the grant free access data transmission in the resource with PIDx is enabled. FIG. 12 illustrates an example in which two PIDxs can be identified. However, PIDx-1 to PIDx-4 may be prepared to allow four PIDxs to be identified.

The process ID may be extended depending on a search space in which the terminal apparatus detects the grant for the retransmission with PIDx. PIDx-1 may be provided in a case that the grant is detected in a Common Search Space (CSS), and PIDx-2 may be provided in a case that the grant is detected in a UE-specific Search Space (USS). The process ID may be extended depending on an aggregation level provided at the time of detection, by the terminal apparatus, of the grant for the retransmission with PIDx. In a case that aggregation levels 1, 2, 4, and 8 are available, PIDx-1 to PIDx-4 may be determined, based on which aggregation level the grant has been detected at. The process ID may be extended, based on candidates on which blind decoding is attempted. The respective candidates correspond to PIDx-1 to PIDn_ss (n_ss is the number of candidates to be blind-coded), and PIDx-1 to PIDn_ss may be determined by using candidates for which the grant has been detected. The terminal apparatus may extend the process ID depending on a DCI format used at the time of detection of the grant for the retransmission with PIDx. For example, PIDx-1 and PIDx-2 may be determined depending on whether the DCI format is DCI format 1A or DCI2.

The process ID may be extended in association with a parameter (cyclic shift, or RF or frequency position of Comb) related to the DMRS and included in the grant for the retransmission with PIDx notified by the base station apparatus. For example, PIDx-1 may be used for the same configuration as that of the parameter related to the DMRS used for the grant free access data transmission, and PIDx-2 may be used for a different configuration. In another example, in a case that the cyclic shift of the DMRS includes eight patterns, PIDx-1 to PIDx-8 may be determined from the amount of rotation in the cyclic shift.

The process ID may be extended in association with any other parameter) included in the grant for the retransmission with PIDx notified by the base station apparatus, and in the retransmission, for example, support of retransmission of incremental redundancy may be omitted, and the value of the RV or some of the fields in the NDI or MCS may be used.

The present embodiment corresponds to an example in which the process number associated with the radio resource for the grant free access is precluded from being used as a process number for initial schedule-based transmission.

Thus, eight uplink process numbers may be available, with 0 to 3 used for the grant free access and 4 to 7 used for the schedule-based access. Different RNTIs may be used to decode the grant for the retransmission for the grant free access data transmission and to decode the grant for the retransmission for the schedule-based access data transmission. Eight uplink process numbers may be available and may be used for each of the grant free access and the schedule-based access. In other words, process management may be performed, based on the type of the detected RNTI and information about the process ID included in the DCI.

In the present embodiment, transmission opportunities for the grant free access have been described in terms of slots, but the slot may be replaced with an OFDM symbol unit, multiple OFDM symbol units, or a subframe unit.

In the present embodiment, the method has been illustrated in which the process ID of the schedule-based data transmission during the retransmission is extended in the retransmission corresponding to the grant free access data transmission in the resource with PIDx. In this case, the resource for the grant free access can be used that is associated with process ID used for the schedule-based data transmission in the retransmission. As a result, a reduction in usable resources for the grant free access can be prevented, low latency can be achieved, the radio resources can be efficiently used, enabling improvement of the frequency efficiency.

Fourth Embodiment

In the scheduled access, the base station apparatus transmits the SRS to recognize the uplink channel information for each terminal apparatus. The base station apparatus notifies the terminal apparatus of the following through the RRC as SRS transmission parameters: a period, a time offset, a frequency position, a bandwidth, and a frequency hopping pattern for the SRS transmission, a repetition factor (RF) for IFDM and an offset for IFDM (RF and offset are collectively referred to as comb related information), an antenna port, and SRS target received power. The SRS for which the SRS transmission period is configured as in the above-described transmission parameters and which is periodically transmitted is referred to as a Periodic SRS. On the other hand, a method is available in which the SRS transmission timing is specified in the DCI without determination of the transmission timing such as the SRS transmission period, and this method is referred to as an Aperiodic (non-periodic) SRS. Like the Periodic SRS, the Aperiodic SRS notifies the terminal apparatus of the transmission parameters other than the transmission period and the time offset through the RRC.

On the other hand, in URLLC grant free access, the data transmission is performed only in a case that the terminal apparatus holds data, and thus the data transmission may be absent for an extended period of time. However, to achieve reliable communication, accurate closed-loop transmission power control or timing alignment is preferably performed. However, in the SRS for the scheduled access, the transmission period, frequency position, bandwidth, and frequency hopping pattern in the SRS transmission parameters are not determined for the URLLC grant free access. Thus, the transmission parameters for the SRS for the URLLC grant free access are preferably configured differently from the parameters for the SRS for the scheduled access. Thus, in the present embodiment, the SRS transmission parameters are configured separately for the scheduled access and for the URLLC grant free access.

Figure 13:
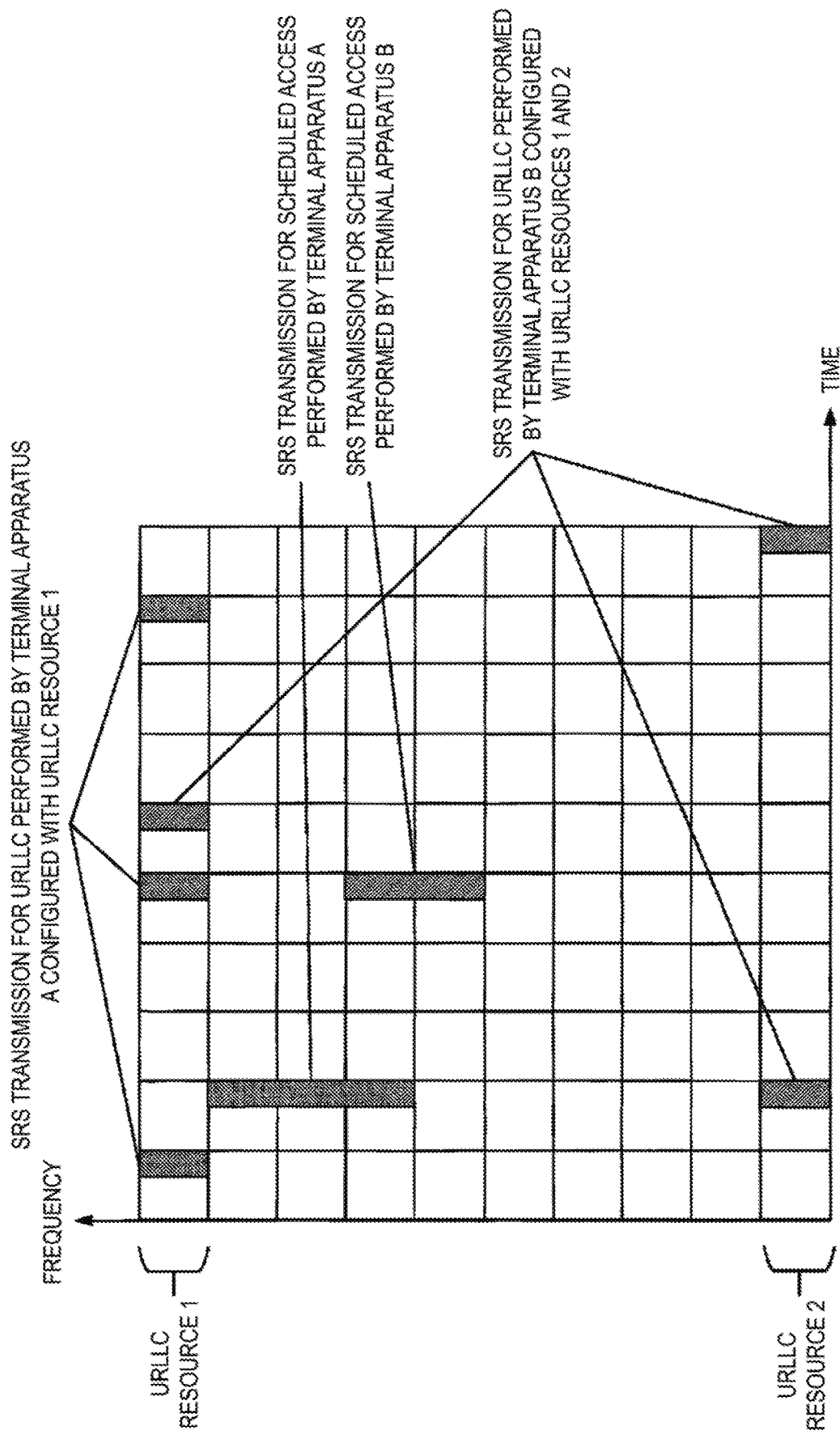
FIG. 13 is a diagram illustrating an example of SRS transmission according to a fourth embodiment.

FIG. 13 illustrates an example of SRS transmission according to the present embodiment. FIG. 13 illustrates an example of transmission of the Periodic SRS. In FIG. 13, divisions of frequencies are assumed to correspond to resource blocks or resource block groups each including multiple resource blocks. Each of the resource blocks includes multiple subcarriers, and may be constituted with, for example, 12 subcarriers or 24 subcarriers. Divisions in a time direction in FIG. 13 are assumed to correspond to frames (radio frames), subframes, or slots, or the number of OFDM symbols corresponding to the minimum unit for scheduling (the number is smaller than the number of OFDM symbols constituting the slot). For the slot, for example, seven OFDM symbols may constitute one slot. For the subframe, for example, two slots may constitute one subframe. For the frame (radio frame), for example, 10 subframes may constitute one frame. An example will be described below in which the divisions in the frequency direction are assumed to correspond to resource block groups, whereas the divisions in the time direction are assumed to correspond to slots. The example in FIG. 13 corresponds to a case in which a URLLC resource that can be used for the URLLC grant free access is not frequency-hopped. In other words, in this case, the resource block group for the URLLC resource does not vary depending on the frame, subframe, slot, and OFDM symbol. FIG. 13 illustrates an example in which two URLLC resources are allocated at both ends of usable resource block groups (both ends of resource block groups that can be used for one serving cell or one component carrier). However, one aspect of the present invention is not limited to this example. For example, the multiple URLLC resources may be adjacent resource block groups. In a case that the resource block groups at both ends or non-contiguous resource block groups are URLLC resources as in the example in FIG. 13, there is a reduced possibility that channel gains of multiple URLLC resources decrease due to frequency selective fading. On the other hand, in a case that the URLLC resources are adjacent resource block groups (e.g., in a case that the number of URLLC resources is two and URLLC resource 1 in FIG. 13 and a resource block group adjacent to this resource is referred to as URLLC resource 2), the number of guard bands required is advantageously reduced in a case that signals with different subcarrier spacings (numerologies), different frame structures, or the like are frequency-division multiplexed. FIG. 13 illustrates an example in which the URLLC resource can be used in all slots. However, limitation to this example of the present invention is not intended, and for example, the URLLC resource may be configured with a period of two slots or four slots.

FIG. 13 illustrates a case in which two terminal apparatuses transmit the SRS and include a terminal apparatus A that can perform grant free access in URLLC resource 1 and a terminal apparatus B that can perform grant free access in at least one of URLLC resource 1 or URLLC resource 2. First, for the terminal apparatus A, SRS transmission parameters for the scheduled access and SRS transmission parameters for the URLLC are configured, and the SRS transmission parameters for the scheduled access are as described above. On the other hand, the SRS transmission parameters for the URLLC involve limitation on the resource block groups that can be used for the grant free access data transmission, and may include the SRS transmission parameters described above other than at least one of the frequency position, bandwidth, or frequency hopping pattern used for the SRS transmission. Thus, the resource block group that transmits the SRS for the URLLC may be determined, based on URLLC resource information configured through higher layer signaling such as the RRC. The resource block group that transmits the SRS for the URLLC may be determined, based on both the URLLC resource information configured through higher layer signaling such as the RRC and the SRS transmission parameter information for the URLLC. Specifically, multiple URLLC resources are configured, and information on the order of URLLC resources using, for transmission, the SRS for the URLLC may be included in the SRS transmission parameters for the URLLC. Note that the SRS transmission parameters for the scheduled access may be SRS transmission parameters for non-URLLC.

The SRS transmission parameters for the URLLC may allow configuration of a transmission period shorter than the transmission period of a scheduled access SRS to enable accurate timing alignment and closed-loop transmission power control. For example, the minimum number of slots that can be configured by using the SRS transmission period for the URLLC may be smaller than the minimum number of slots that can be configured by using the SRS transmission period for the scheduled access. In another example, the unit of the specified period may vary, that is, the SRS transmission period for the URLLC can be specified in the number of OFDM symbols or the number of slots, and the SRS transmission period for the scheduled access may be specified in the number of subframes or the number of radio frames. In FIG. 13, the terminal apparatus transmits, in URLLC resource 1, the SRS once in four slots (a period of four slots), and in non-URLLC resources, the SRS for three resource block groups with a period longer than four slots.

The antenna port varies between the SRS for the URLLC and the SRS for the scheduled access, and an antenna port X for the SRS for the URLLC may be configured as an antenna port Y for the SRS for the scheduled access (X≠Y). The SRS for the URLLC can only be transmitted through one antenna port, the SRS transmission parameters for the URLLC include no configuration for the antenna port, the SRS for the scheduled access can be transmitted through multiple antenna ports, and the SRS transmission parameters for the scheduled access may include a configuration for the antenna port.

The terminal apparatus B in FIG. 13 can use multiple URLLC resources, and thus the SRS transmission parameters for the URLLC may include information about a URLLC resource for the start of the transmission. For example, the terminal apparatus B may be configured with URLLC resources in advance through higher layer signaling, and may receive the information about the URLLC resource for the start of the transmission as the SRS transmission parameters for the URLLC. The terminal apparatus B in FIG. 3 illustrates an example in which the terminal apparatus B transmits the SRS with a period of four slots in the order of URLLC resource 2 and URLLC resource 1, and in the non-URLLC resources, transmits the SRS for two resource block groups with a period longer than four slots. The SRS transmission parameters for the URLLC received by the terminal apparatus B may include the information about the number of URLLC resources used for the SRS transmission in one OFDM symbol. For example, in a case of receiving a transmission parameter for the simultaneous transmission of the SRS for the URLLC in two URLLC resources, in FIG. 13, the terminal apparatus B transmits the SRS for the URLLC simultaneously at both ends of the resource block groups that can be used for one serving cell.

Figure 14:
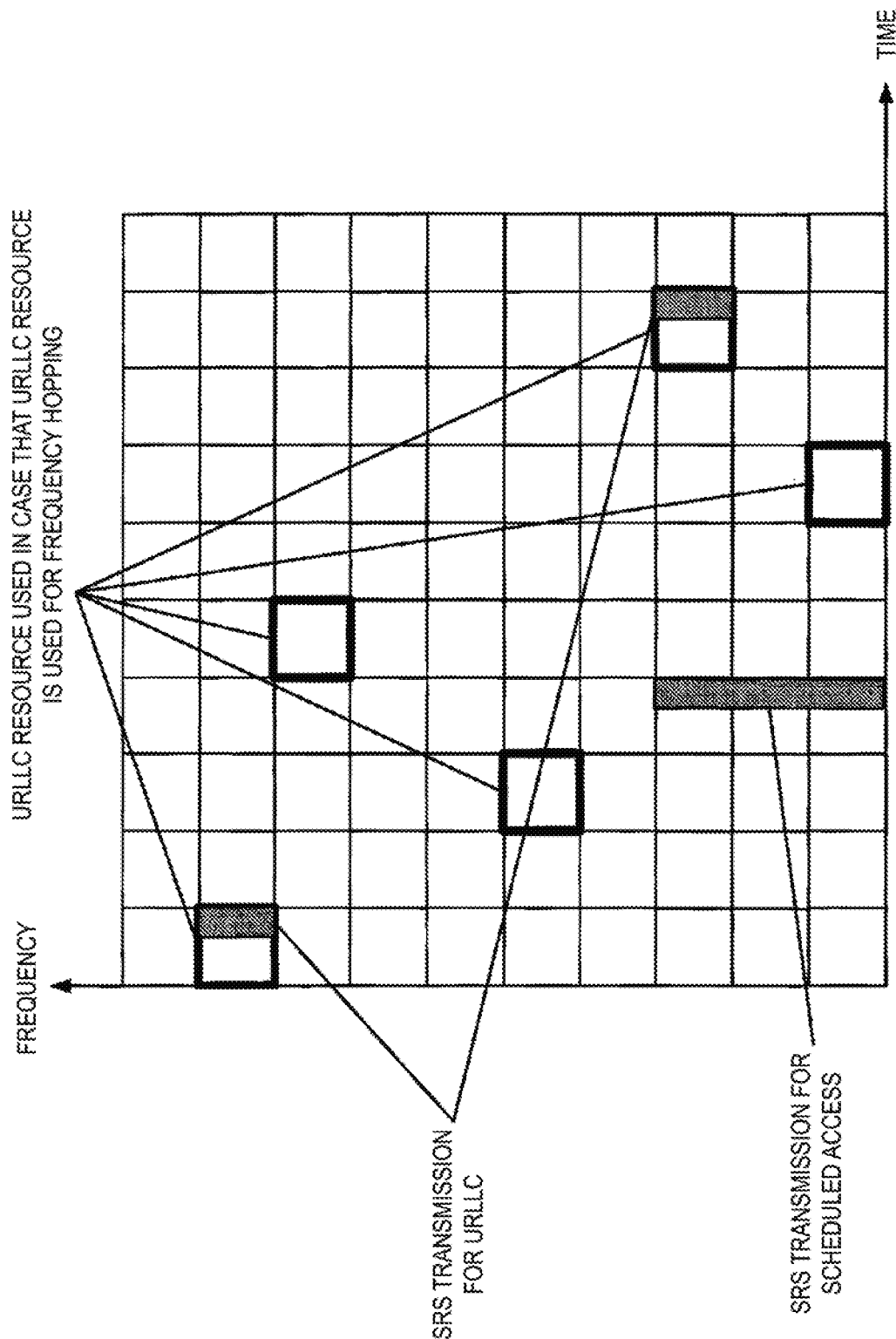
FIG. 14 is a diagram illustrating an example of the SRS transmission according to the fourth embodiment.

FIG. 14 illustrates an example of SRS transmission according to the first embodiment. FIG. 14 illustrates an example of transmission of the Periodic SRS in which a URLLC resource that can be used for the URLLC grant free access is frequency-hopped. In other words, in this case, the resource block group for the URLLC resource varies depending on the frame, subframe, slot, and OFDM symbol. In the example in FIG. 14, the URLLC resource is configured with a period of two slots. However, one aspect of the present invention is not limited to this example. In FIG. 14, as in the case of FIG. 13, the resource block group that transmits the SRS for the URLLC may be determined, based on the URLLC resource information configured through higher layer signaling such as the RRC. The resource block group that transmits the SRS for the URLLC may be determined, based on both the URLLC resource information configured through higher layer signaling such as the RRC and the SRS transmission parameter information for the URLLC.

FIG. 14 illustrates a case in which one terminal apparatus transmits the SRS, and an example in which the SRS is transmitted once for four URLLC resources. In the example in FIG. 14, as the SRS transmission period for the URLLC, the base station apparatus transmits a configuration for transmitting the SRS once for A URLLC resources, to the terminal apparatus through higher layer signaling such as the RRC. In a case that the URLLC resources are configured with a period of B slots, the terminal apparatus transmits the SRS for the URLLC with a period of AB (product of A and B) slots. Accordingly, in the example in FIG. 14, A=4 and B=2, and the terminal apparatus transmits the SRS with a period of 8 slots. On the other hand, the SRS transmission in FIG. 1 is an example in which for the SRS transmission for the scheduled access, a bandwidth of three resource block groups for one SRS transmission is indicated to the terminal apparatus, and thus the period is configured to be longer than the period of the SRS transmission for the URLLC.

In FIG. 14, the terminal apparatus may perform the SRS transmission for the scheduled access only in slots for which no URLLC resource is configured. Specifically, the terminal apparatus transmits the SRS for the scheduled access in the case of a timing including no resource block group for the URLLC resource and used for the SRS transmission for the scheduled access. On the other hand, the terminal apparatus does not transmit the SRS for the scheduled access in a case of a timing including a resource block group for the URLLC resource and used for the SRS transmission for the scheduled access. The control in which the terminal apparatus performs the SRS for the scheduled access depending on whether the timing for the SRS transmission for the scheduled access corresponds to a slot including a resource block group for the URLLC resource may be limited only to a case where the configured period for the URLLC resource is equal to or longer than C slots. For example, C may be 2 or larger.

Figure 15:
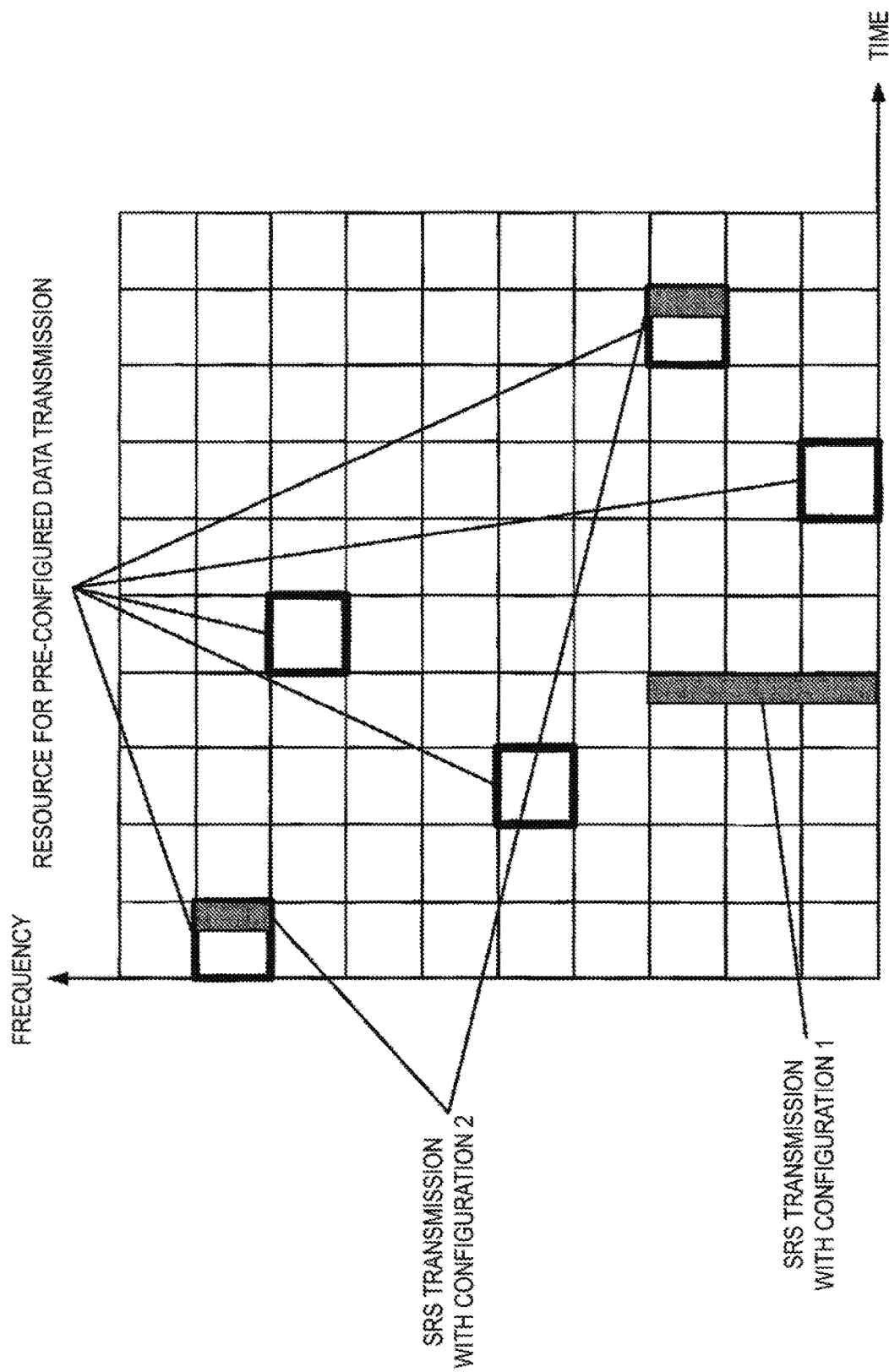
FIG. 15 is a diagram illustrating an example of the SRS transmission according to the fourth embodiment.

FIG. 15 illustrates an example of the SRS transmission according to the first embodiment. FIG. 15 illustrates an example of transmission of the Periodic SRS in which two configurations are provided for the SRS transmission. In SRS transmission with configuration 1, the following are notified through the RRC as transmission parameters: the period, time offset, frequency position, bandwidth, and frequency hopping pattern for the SRS transmission, the comb related information, the antenna port, and the target received power for the SRS. On the other hand, in SRS transmission with configuration 2, the transmission parameters are notified through the RRC as is the case with configuration 1 except for at least one of the frequency position, bandwidth, and frequency hopping pattern used for the SRS transmission. In the SRS transmission with configuration 2, for the use in a case that the resource block group used for the data transmission is limited, at least one of the frequency position and bandwidth for the SRS transmission may be determined, based on information about the resource block group for the data transmission notified in advance through the RRC or the like. The resource block group used for the SRS transmission with configuration 2 may be determined, based on both the resource block group for the data transmission notified in advance through the RRC or the like and the information about the transmission parameters for the SRS transmission with configuration 2. The SRS with configuration 1 and the SRS with configuration 2 may be SRS transmissions for different beams. In this case, configuration 1 may involve performing SRS transmission with multiple beams, and configuration 2 may involve performing SRS transmission with a specific beam. The SRS with configuration 1 and the SRS with configuration 2 may be SRS transmissions at different subcarrier spacings. The SRS with configuration 1 and the SRS with configuration 2 may be SRS transmissions in different serving cells. The SRS with configuration 1 and the SRS with configuration 2 may be SRS transmissions with different frame structures.

Figure 16:
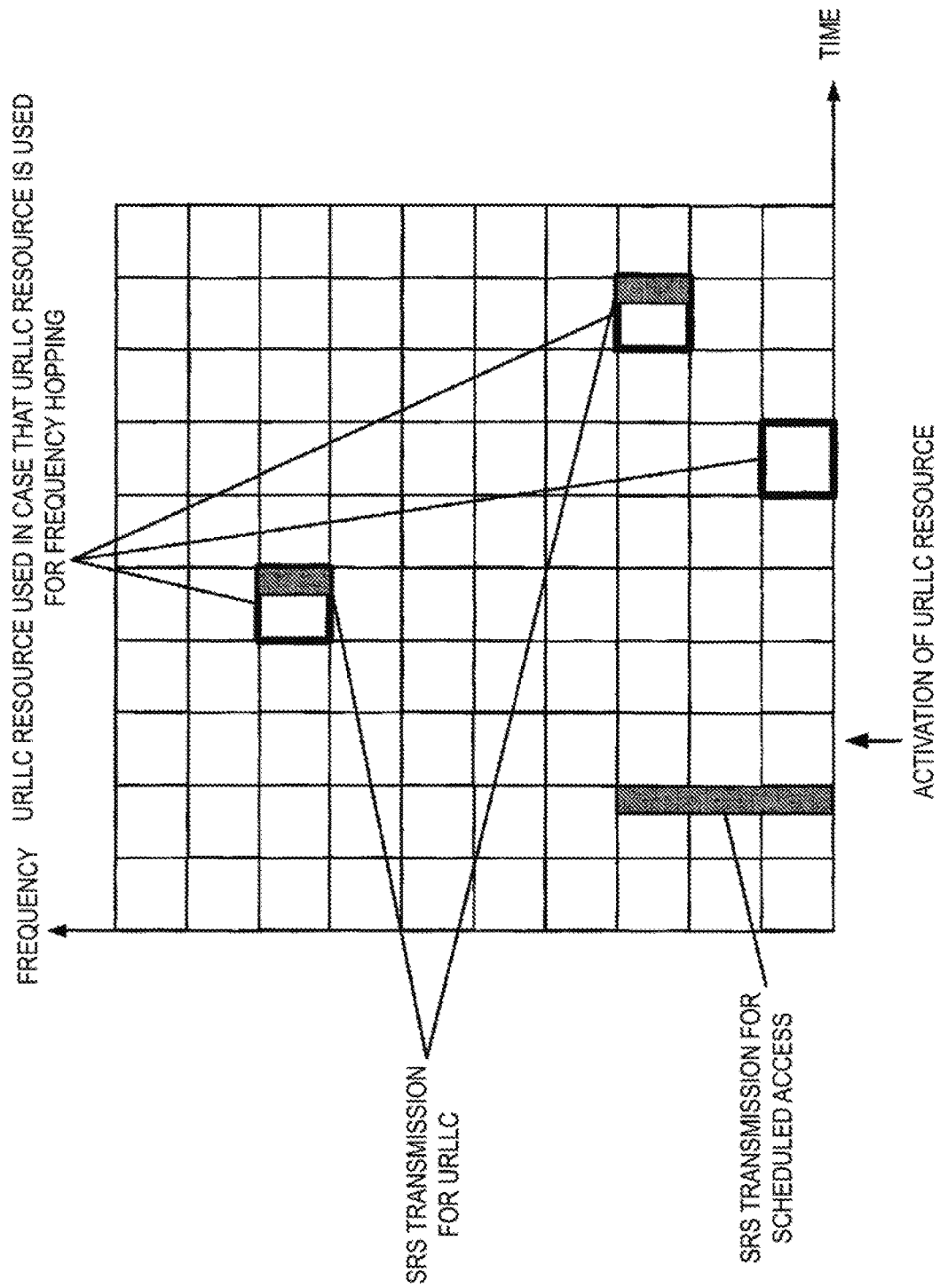
FIG. 16 is a diagram illustrating an example of the SRS transmission according to the fourth embodiment.

FIG. 16 illustrates an example of the SRS transmission according to the first embodiment. FIG. 16 illustrates an example of transmission of the Periodic SRS in which the SRS transmission for the scheduled access and the SRS transmission for the URLLC are performed. First, as the SRS transmission parameters for the scheduled access, the terminal apparatus is notified, through the RRC, of the period, time offset, frequency position, bandwidth, and frequency hopping pattern for the SRS transmission, the comb related information, the antenna port, and the target received power for the SRS. The terminal apparatus then transmits the SRS, based on the transmission parameters. FIG. 16 illustrates a case in which the SRS for the scheduled access is transmitted in three resource block groups. In a case of activating a URLLC resource for the terminal apparatus, the base station apparatus notifies the terminal apparatus of the SRS transmission parameters for the URLLC. In a case of receiving the SRS transmission parameters for the URLLC, the terminal apparatus interrupts the SRS transmission for the scheduled access. In other words, the terminal apparatus does not perform the SRS transmission for the scheduled access and transmits only the SRS for the URLLC while the configuration for the periodic transmission of the SRS for the URLLC is valid, as illustrated in FIG. 16. Here, the base station apparatus notifies the SRS transmission parameters for the URLLC simultaneously with the activation of the URLLC resource, as described above. However, one aspect of the present invention is not limited to this example. For example, after notifying the activation of the URLLC resource, the base station apparatus may notify the SRS transmission parameters for the URLLC as necessary. The base station apparatus may notify the SRS transmission parameters for the URLLC and acquire the uplink channel information, and then activate the URLLC resource. The terminal apparatus may interrupt the SRS for the URLLC by deactivating (releasing) the URLLC resource or removing (releasing) the SRS transmission parameters for the URLLC, and resume the SRS transmission for the scheduled access.

In the present embodiment, the example of the transmission of the Periodic SRS has been described. However, the present embodiment may also be applied to the transmission of the Aperiodic SRS. For example, multiple parameters for SRS transmissions that can be triggered by the Aperiodic SRS may be present, and may be configured such that the parameters for at least one SRS transmission exclude at least one of the frequency position, bandwidth, and frequency hopping pattern used, whereas the parameters for the remaining SRS transmissions include the frequency position, bandwidth, and frequency hopping pattern used.

The SRS transmission may be omitted in a case that the slot for the grant free access data transmission matches the slot in which the SRS transmission is triggered.

In the present embodiment, the resource used for the SRS transmission for the URLLC is determined, based at least on information about resources that can be used for the URLLC data transmission. However, in a case that the number of resource blocks or resource block groups for the data transmission is not the configurable number of resource blocks or resource block groups for the SRS transmission, the SRS may be transmitted as follows. In one example, SRS sequences are generated by using a minimum configurable number of SRS transmission resource blocks or resource block groups, the number being larger than the number of resource blocks or resource block groups for the data transmission, the SRS sequences are allocated to resource elements in order of increasing/decreasing sequence index, and SRS sequences that fail to be allocated are not transmitted. In another example, SRS sequences are generated by using a maximum configurable number of SRS transmission resource blocks or resource block groups, the number being equal to or smaller than the number of resource blocks or resource block groups for the data transmission, and the SRSs are transmitted in some of the resource blocks or resource block groups for the data transmission.

In the present embodiment, the base station apparatus notifies the terminal apparatus of each of the SRS transmission parameters for the URLLC and the SRS transmission parameters for the scheduled access. The resource used for transmission of the SRS for the URLLC is determined, based at least on the information about the resources that can be used for the URLLC data transmission, and the resource used for transmission of the SRS for the scheduled access is determined, based only on the SRS transmission parameters for the scheduled access. In this manner, SRS transmission is enabled that is suited for each of the applications including data transmission with multiple parameters (including whether the data transmission is based on the grant free access or the scheduled access)/data transmission with multiple request conditions/data transmission with multiple transmission modes. As a result, in the URLLC grant free access, accurate closed-loop transmission power control and timing alignment can be implemented and reliable data transmission can be efficiently performed, allowing improvement of the frequency efficiency to be realized.

Fifth Embodiment

The present embodiment corresponds to an example in which the base station apparatus notifies the terminal apparatus of each of the SRS transmission parameters for the URLLC and the SRS transmission parameters for the scheduled access and in which the same slot or the same OFDM symbol corresponds to the transmission timing for the SRS for the URLLC and the SRS for the scheduled access (transmission of the SRS for the URLLC and the SRS for the scheduled access is triggered in the same slot or the same OFDM symbol). A communication system according to the present embodiment includes the terminal apparatus 20 and the base station apparatus 10 described with reference to FIG. 3, FIG. 5, and FIG. 6. Differences from/additions to the first embodiment will be mainly described below.

Figure 17:
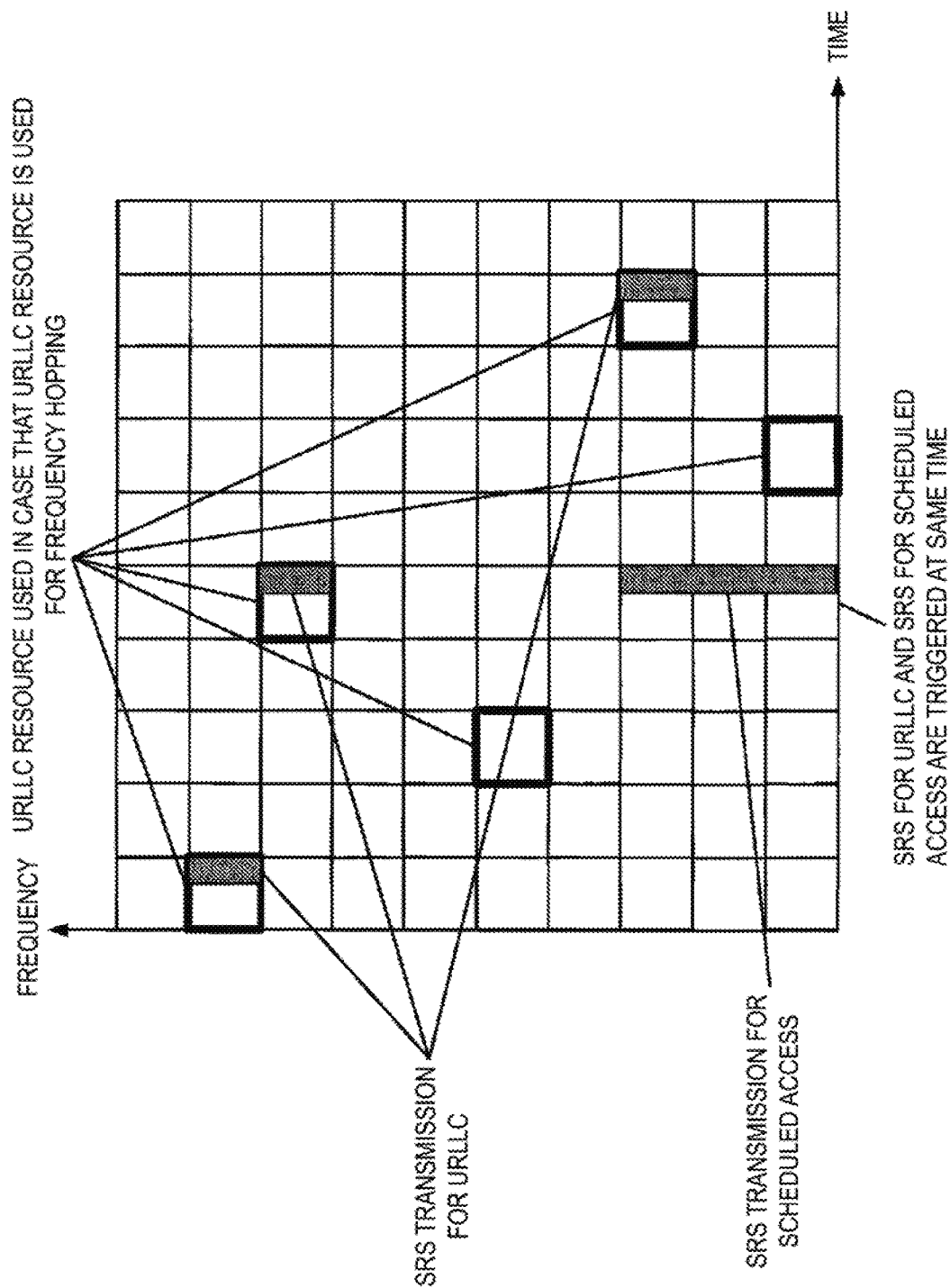
FIG. 17 is a diagram illustrating an example of SRS transmission according to a fifth embodiment.

FIG. 17 illustrates an example of SRS transmission according to the second embodiment. FIG. 17 illustrates an example of transmission of the Periodic SRS in which a URLLC resource that can be used for a URLLC grant free access is frequency-hopped. In the example in FIG. 17, the URLLC resource is configured with a period of two slots. However, one aspect of the present invention is not limited to this example. In FIG. 17, as in the case of FIG. 13, the resource block group that transmits the SRS for the URLLC may be determined, based on the URLLC resource information configured through higher layer signaling such as the RRC. The resource block group that transmits the SRS for the URLLC may be determined, based on both the URLLC resource information configured through higher layer signaling such as the RRC and the SRS transmission parameter information for the URLLC.

FIG. 17 illustrates a case in which one terminal apparatus transmits the SRS, and in this example, the SRS is transmitted once for two URLLC resources. On the other hand, the SRS transmission in FIG. 17 is an example in which for the SRS transmission for the scheduled access, a bandwidth of three resource block groups for one SRS transmission is indicated to the terminal apparatus, and thus the period is configured to be longer than the period of the SRS transmission for the URLLC.

In the fifth slot from the left of FIG. 17, the SRS for the URLLC and the SRS for the scheduled access are triggered in the same slot, and the behavior of the terminal apparatus according to one aspect of the present invention in this case will be described. The terminal apparatus notifies the base station apparatus, in advance, of the UE Capabilities related to the SRS. One of UE Capabilities related to the SRS includes information indicating whether multiple SRS transmissions are enabled within the same serving cell, and this UE Capability is hereinafter referred to as a Multi-SRS transmission function. Here, the Multi-SRS transmission function may be information indicating whether multiple SRS transmissions are enabled within multiple serving cells. The Multi-SRS transmitting function may be information about a UE Capability for Dual Connectivity. The Multi-SRS transmission function may be information indicating whether multiple SRS transmissions are enabled within a Primary Cell Group (PCG) or a Secondary Cell Group (SCG) for Dual Connectivity.

In a case described below, the terminal apparatus includes the Multi-SRS transmission function, and the transmission of the SRS for the URLLC and the SRS for the scheduled access is triggered in the same slot. In this case, the terminal apparatus calculates each of transmit power for the SRS for the URLLC and transmit power for the SRS for the scheduled access. Here, the SRS for the URLLC and the SRS for the scheduled access may differ at least in an integrated value for closed-loop transmission power control. Each of the SRS for the URLLC and the SRS for the scheduled access may be notified by using at least a configuration of target received power as a transmission parameter. The SRS for the URLLC and the SRS for the scheduled access may have different values for the target received power, and one target received power may be notified, whereas, for the other target received power, only an offset value from the notified target received power may be notified.

An example of a calculation formula for the SRS transmit power, used by the terminal apparatus, is $P_{SRS,c}(i) = \min\{P_{CMAX,c}(i), P_{SRS\_OFFSET,c}(m) + 10 \log_{10}(M_{SRS,c}(i)) + P_{O\_PUSCH,c}(j) + \alpha_c(j) \cdot PL_c + f_{c,q}(i)\}$. Here, min selects a small value within { }. $P_{CMAX,c}(i)$ is the maximum allowable transmit power for the terminal apparatus in the i-th subframe in a serving cell c, $P_{SRS\_OFFSET,c}(m)$ is an offset value configured in a higher layer, m=0 is the Periodic SRS (Type0), m=1 is the Aperiodic SRS (Type1), $M_{SRS,c}(i)$ is the bandwidth (number of resource blocks or resource block groups) of the SRS transmitted in the i-th subframe in the serving cell c, $P_{O\_PUSCH,c}(j)$ is nominal target received power per RB in scheduling j in the serving cell c (fixed to j=1), $\alpha_c(j)$ is a parameter (fixed to j=1) for fractional transmission power control in serving cell c, $PL_c$ is a path loss in the serving cell c, $f_{c,q}(i)$ is a parameter for closed-loop transmission power control for the serving cell c and a transmission q, and q is a parameter indicating whether the SRS transmission is for the URLLC or for the scheduled access. $P_{O\_PUSCH,c}(j)$ used for calculation of transmit power is determined by a sum of $P_{O\_NOMINAL\_PUSCH,c}(j)$ and $P_{O\_UE\_PUSCH,c}(j)$. $P_{O\_NOMINAL\_PUSCH,c}(j)$ is notified through the RRC. $P_{CMAX,c}(i)$ is configured between $P_{CMAX\_L,c}(i)$ determined from Maximum Power Reduction (MPR), Additional-MPR (A-MPR), and Power Management-MPR (P-MPR) and $P_{CMAX\_H,c}(i)$ determined from $P_{EMAX,c}$ and $P_{PowerClass}$, in accordance with the capability of a Power Amplifier (PA) of the terminal apparatus.

In a case that the sum of the transmit power for the SRS for the URLLC and the transmit power for the SRS for the scheduled access each calculated by the terminal apparatus is smaller than $P_{CMAX,c}(i)$, both SRS are transmitted in the same slot. On the other hand, in a case that the sum of the transmit power for the SRS for the URLLC and the transmit power for the SRS for the scheduled access each calculated by the terminal apparatus is larger than $P_{CMAX,c}(i)$, the transmit power is allocated in priority to the SRS for the URLLC. Here, for the SRS to which the transmit power is preferentially allocated, the SRS for the grant free access may take priority over the SRS for the scheduled access, or the SRS for the URLLC may take priority over the SRS for the non-URLLC (e.g. eMBB or mMTC).

Based on a calculation result $P_{SRS\_URLLC,c}(i)$ for the transmit power for the SRS for the URLLC, a calculation result $P_{SRS\_Schedule,c}(i)$ for the transmit power for the SRS for the scheduled access, and the maximum allowable transmit power $P_{CMAX,c}$ for the terminal apparatus, the transmit power is preferentially allocated to the SRS for the URLLC as follows. The transmit power for the SRS for the URLLC is assumed to be equal to the calculation result $P_{SRS\_URLLC,c}(i)$, and the transmit power for the SRS for the scheduled access is assumed to be equal to $P_{CMAX,c}(i) - P_{SRS\_URLLC,c}(i)$. In preparation for shortage of transmit power, $P_{CMAX,c}(i) - P_{SRS\_URLLC,c}(i) < P_{SRS\_Schedule,c}(i)$ is satisfied. For the terminal apparatus, a lower limit $T_{SRS\_Schedule}$ for the transmit power for the SRS for the scheduled access may be configured, and in this case, the SRS for the scheduled access may be transmitted only in a case that $T_{SRS\_Schedule} \leq P_{CMAX,c}(i) - P_{SRS\_URLLC,c}(i)$ is satisfied. $T_{SRS\_Schedule}$ may be notified to the terminal apparatus by the base station apparatus through higher layer signaling such as the RRC. The terminal apparatus need not transmit the SRS for the scheduled access in a case that $T_{SRS\_Schedule} > P_{CMAX,c}(i) - P_{SRS\_URLLC,c}(i)$.

In a case that the SRS for the URLLC and the SRS for the scheduled access are triggered in the same slot, the terminal apparatus may always transmit only the SRS for the URLLC in a case that the lower limit $T_{SRS\_Schedule}$ for the transmit power of the SRS for the scheduled access is not configured through higher layer signaling such as the RRC. $T_{SRS\_Schedule} = 0$ may be configurable, and in a case that $T_{SRS\_Schedule}=0$, the terminal apparatus may always transmit the SRS for the scheduled access in a case that $P_{CMAX,c}(i)-P_{SRS\_URLLC,c}(i)$ has a positive value. In a case of not including the Multi-SRS transmission function, the terminal apparatus may transmit only the SRS for the URLLC.

In the present embodiment, in a case that the SRS for the URLLC and the SRS for the scheduled access are triggered at the same timing, the terminal apparatus gives priority to the SRS transmission for the URLLC or to the transmit power allocated to the SRS for the URLLC. As a result, in the URLLC grant free access, accurate closed-loop transmission power control and timing alignment can be implemented and reliable data transmission can be efficiently performed, allowing improvement of the frequency efficiency to be realized.

Modified Example of Fifth Embodiment

The present modified example corresponds to an example in which the base station apparatus notifies the terminal apparatus of each of the SRS transmission parameters for the URLLC and the SRS transmission parameters for the scheduled access and in which the same slot or the same OFDM symbol corresponds to a transmission timing for the SRS for the URLLC and the SRS for the scheduled access (transmission of the SRS for the URLLC and the SRS for the scheduled access is triggered in the same slot or the same OFDM symbol). A communication system according to the present embodiment includes the terminal apparatus 20 and the base station apparatus 10 described with reference to FIG. 3, FIG. 5, and FIG. 6. Differences from/additions to the first embodiment will be mainly described below.

The present modified example corresponds to a case in which the transmission of the Aperiodic SRS is performed as well as transmission of the Periodic SRS. The present modified example is, as in FIG. 17 in the preceding embodiment, an example of a case in which the same slot or the same OFDM symbol corresponds to a transmission timing for multiple types of SRSs (transmission of the multiple types of SRSs is triggered in the same slot or the same OFDM symbol).

In a case that the terminal apparatus includes the Multi-SRS transmission function and multiple SRS transmissions are triggered in the same slot, transmit power is allocated in order of decreasing priority. The priority for the SRSs may be in the order of the Aperiodic SRS for the URLLC, Aperiodic SRS for the scheduled access, the Periodic SRS for the URLLC, and the Periodic SRS for the scheduled access. In this case, the terminal apparatus calculates the transmit power for each of the triggered SRSs. Here, the Aperiodic/Periodic SRS for the URLLC and the Aperiodic/Periodic SRS for the scheduled access may differ at least in the integrated value of the closed-loop transmission power control. Each of the Aperiodic/Periodic SRS for the URLLC and the Aperiodic/Periodic SRS for the scheduled access may be notified by using at least the configuration of the target received power as a transmission parameter. The Aperiodic/Periodic SRS for the URLLC and the Aperiodic/Periodic SRS for the scheduled access may have different target received power values. One of the target received power may be notified, and for the other target received power, only an offset value from the notified target received power may be notified.

An example of a calculation formula for the transmit power for the SRS is the same as the example in the preceding embodiment. In a case that the sum of the calculated transmit power for each SRS is smaller than $P_{CMAX,c}(i)$, all the SRSs are transmitted in the same slot. On the other hand, in a case that the sum of the calculated transmit power for each SRS is larger than $P_{CMAX,c}(i)$, the transmit power is allocated in order of decreasing priority.

The SRS transmit power is determined as described below from the calculation result $P_{SRS\_A\_URLLC,c}(i)$ for the transmit power for the Aperiodic SRS for the URLLC, the calculation result $P_{SRS\_A\_URLLC,c}(i)$ for the transmit power for the Periodic SRS for the URLLC, the calculation result $P_{SRS\_A\_Scheduled,c}(i)$ for the transmit power for the Aperiodic SRS for the scheduled access, the calculation result $P_{SRS\_A\_Scheduled,c}(i)$ for the transmit power for the Periodic SRS for the scheduled access, and the maximum allowable transmit power $_{CMAX,c}(i)$ for the terminal apparatus. The transmit power for the Aperiodic SRS for the URLLC is assumed to be the calculation result $P_{SRS\_A\_URLLC,c}$, the transmit power for the Aperiodic SRS for the scheduled access is assumed to be $\min\{P_{SRS\_A\_Schedule,c}(i), P_{CMAX,c}(i)-P_{SRS\_A\_URLLC,c}(i)\}$, and in a case that this value is larger than the lower limit $T_{A\_SRS\_Schedule}$ of the transmit power for the Aperiodic SRS for the scheduled access, the Aperiodic SRS for the scheduled access is transmitted. The sum of the transmit power for the Aperiodic SRS for the URLLC and for the scheduled access is assumed to be $P_{A\_SRS,c}(i)$. In a case that $P_{CMAX,c}(i)-P_{A\_SRS}>0$, the terminal apparatus sets the transmit power for the Periodic SRS for the URLLC to $\min\{P_{SRS\_P\_URLLC,c}(i), P_{CMAX,c}(i)-P_{A\_SRS,c}(i)\}$. In a case that this value is larger than the lower limit $T_{P\_SRS\_URLLC}$ of the transmit power for the Periodic SRS for the URLLC, the terminal apparatus transmits the Periodic SRS for the URLLC. Furthermore, the sum of the transmit power for the Aperiodic SRS for the URLLC and for the scheduled access and the Periodic SRS for the URLLC is assumed to be $P_{3SRS,c}(i)$. In a case that $P_{CMAX,c}(i)-P_{3SRS,c}(i)>0$, the terminal apparatus sets the transmit power for the Periodic SRS for the scheduled access to $\min\{P_{SRS\_P\_Scheduled,c}(i), P_{CMAX,c}(i)-P_{3SRS,c}(i)\}$. In a case that this value is larger than the lower limit $T_{P\_SRS\_Schedule}$ of the transmit power for the Periodic SRS for the scheduled access, the terminal apparatus transmits the Periodic SRS for the scheduled access. Here, the transmit power of the untriggered SRS is assumed to be 0.

For the priority for the allocation of the transmit power to the SRSs, the highest priority is given to the Aperiodic SRS for the URLLC, and the following priorities are given to the Periodic SRS for the URLLC, the Aperiodic SRS for the scheduled access, and the Periodic SRS for the scheduled access in this order. In a case of transmitting the transmission parameters for the Aperiodic SRS for the URLLC and the Aperiodic SRS for the scheduled access, the base station apparatus may notify the terminal apparatus of information about the priority for the allocation of the transmit power to each SRS.

In the present embodiment, in a case that multiple SRS are triggered at the same timing, the terminal apparatus preferentially allocates the transmit power to an SRS with a high priority. As a result, in the URLLC grant free access, accurate closed-loop transmission power control and timing alignment can be implemented and reliable data transmission can be efficiently performed, allowing improvement of the frequency efficiency to be realized.

Sixth Embodiment

In the present embodiment, an example will be described in which the base station apparatus inhibits terminal apparatuses transmitting the SRS for the scheduled access from transmitting the SRS for the scheduled access. A communication system according to the present embodiment includes the terminal apparatus 20 and the base station apparatus 10 described with reference to FIG. 3, FIG. 5, and FIG. 6. Differences from/additions to the first and second embodiments will be mainly described below.

In the present embodiment, in a case that URLLC resource is allocated to the terminal apparatus as in FIG. 17, the terminal apparatus not performing the URLLC data transmission is notified of information about resources for which the SRS transmission is inhibited. For example, the information about the resources for which the SRS transmission is inhibited may be notified by broadcasting or by using Common DCI, which is information common to UEs. Here, the Common DCI may be control information that can be acquired by the terminal apparatuses in the serving cell. The Common DCI may be control information that can be acquired by terminal apparatuses for which no URLLC resource is configured. The information about the resources for which the SRS transmission is inhibited may include the period, frequency position (hopping pattern in a case that frequency hopping is adopted), and the number of resource block groups for each URLLC resource. The terminal apparatus transmitting the SRS for the scheduled access may interrupt (skip) the transmission of the SRS for the scheduled access in a case that a transmission resource for the triggered SRS overlaps the URLLC resource at least at some of the frequencies. In a case that the transmission resource for the triggered SRS overlaps the URLLC resource only at some of the frequencies, the terminal apparatus transmitting the SRS for the scheduled access may transmit the SRS for the scheduled access in a resource not overlapping the URLLC resource.

In this case, the terminal apparatus may generate an SRS with a sequence length corresponding to a bandwidth configured as an SRS transmission parameter for the scheduled access, and may set, as 0, a signal to be allocated to the resource overlapping the URLLC resource. The terminal apparatus may generate an SRS with a sequence length corresponding to a part of the resource that does not overlap with the URLLC resource. The terminal apparatus may generate one of the SRSs described above in a case that the resources for transmission of the SRS for the scheduled access other than the resource overlapping the URLLC resource are not non-contiguous, and may skip the SRS transmission in a case that the resources for transmission of the SRS for the scheduled access are non-contiguous.

In the present embodiment, the base station apparatus inhibits the terminal apparatus transmitting the SRS for the scheduled access from transmitting, in the URLLC resource, the SRS for the scheduled access. As a result, the SRS for the URLLC and the SRS for the scheduled access are prevented from sharing resources, and the accuracy of sounding by the SRS for the URLLC can be improved.

Note that the embodiments herein may be adopted by combining multiple embodiments, or only each of the embodiments may be adopted.

A program running on an apparatus according to an aspect of the present invention may serve as a program that controls a Central Processing Unit (CPU) and the like to cause a computer to operate in such a manner as to realize the functions of the above-described embodiments according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiments may be partially enabled by a computer. In that case, a program for realizing the functions of the embodiments may be recorded on a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used for transmission of the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be preferably used for a base station apparatus, a terminal apparatus, and a communication method. An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

10 Base station apparatus
20-1 to 20-n1 Terminal apparatus
10a Area within which base station apparatus 10 is connectable to terminal apparatus
102 Higher layer processing unit
104 Transmitter
106 Transmit antenna
108 Controller
110 Receive antenna
112 Receiver
1040 Coding unit
1042 Modulation unit
1044 Multiplexing unit
1046 Downlink control signal generation unit
1048 Downlink reference signal generation unit
1049 IFFT unit
1050 Radio transmitting unit
1120 Radio receiving unit
1121 FFT unit
1122 Channel estimation unit
1124 Demultiplexing unit
1126 Signal detection unit
1502 Canceling unit
1504 Equalization unit
1506-1 to 1506-u Multiple access signal separation unit
1508-1 to 1508-u IDFT unit
1510-1 to 1510-u Demodulation unit
1512-1 to 1512-u Decoding unit
1514 Replica generation unit
202 Receive antenna
204 Receiver
206 Higher layer processing unit
208 Controller
210 Transmitter
212 Transmit antenna
2100 Coding unit
2102 Modulation unit
2104 DFT unit
2106 Multiple access processing unit
2108 Multiplexing unit
2109 IFFT unit
2110 Radio transmitting unit
2112 Uplink reference signal generation unit
2040 Radio receiving unit
2041 FFT unit
2042 Demultiplexing unit
2044 Demodulation unit
2046 Decoding unit

The invention claimed is:

1. A terminal apparatus for communicating with a base station apparatus, the terminal apparatus comprising:
a transmitter configured to transmit a physical uplink shared channel (PUSCH); and
a receiver configured to receive radio resource control (RRC) information, wherein
the RRC information includes timeout period for transmission of the PUSCH, and a number of hybrid automatic repeat requests (HARQ) processes in a pre-allocated radio resource,
the resource information for the transmission of the PUSCH includes symbol information for the transmission of the PUSCH, and
the pre-allocated radio resource is shareable among a plurality of terminal devices; and
a controller configured to determine a HARQ process ID based on at least a symbol index for the transmission of the PUSCH and the number of HARQ processes,
the transmitter transmits the PUSCH by using a resource associated with the HARQ process ID irrespective of downlink control information, the resource being a portion of the pre-allocated radio resource, and
in a case that the receiver receives no response to the transmission of the PUSCH with the HARQ process ID after the transmission of the PUSCH is performed and before the timeout period expires, the transmitter transmits the PUSCH by using the resource associated with the HARQ process ID.

2. The terminal apparatus according to claim 1, wherein
in a case that the receiver receives control information indicating retransmission for the PUSCH transmission for the HARQ process ID, the transmitter halts at least the PUSCH transmission in the resource for the transmission of the PUSCH associated with the HARQ process ID until the transmitter receives an acknowledgement (ACK) for the retransmission of the PUSCH using the resource associated with the HARQ process ID.

3. A communication method for a terminal apparatus for communicating with a base station apparatus, the communication method comprising:
receiving radio resource control (RRC) information, wherein
the RRC information includes a timeout period for transmission of a physical uplink shared channel (PUSCH), and a number of hybrid automatic repeat requests (HARQ) processed in a pre-allocated radio resource,
the resource information for the transmission of the PUSCH includes symbol information for the transmission of the PUSCH, and
the pre-allocated radio resource is shareable among a plurality of terminal devices; and
determining a HARQ process ID based on at least a symbol index for the transmission of the PUSCH, and the number of HARQ processes,
transmitting the PUSCH by using a resource associated with the HARQ process ID irrespective of downlink control information, the resource being a portion of the pre-allocated radio resource, and
in a case that no response to the transmission of the PUSCH with the HARQ process ID is received after the transmission of the PUSCH is performed and before the timeout period expires, the PUSCH is transmitted by using the resource associated with the HARQ process ID.

* * * * *